United States Patent
Wiklof

(10) Patent No.: US 7,501,616 B2
(45) Date of Patent: Mar. 10, 2009

(54) METHOD AND APPARATUS FOR CAPTURING AN IMAGE OF A MOVING OBJECT

(75) Inventor: Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 243 days.

(21) Appl. No.: 11/441,859

(22) Filed: May 25, 2006

(65) Prior Publication Data

US 2007/0272841 A1 Nov. 29, 2007

(51) Int. Cl.
G06K 7/10 (2006.01)
H01J 3/14 (2006.01)
H01J 5/16 (2006.01)

(52) U.S. Cl. ............... 250/234; 235/462.31; 235/462.42

(58) Field of Classification Search ................. 250/234, 250/235, 236, 208.1; 235/462.01, 462.09, 235/462.31, 462.42
See application file for complete search history.

(56) References Cited

U.S. PATENT DOCUMENTS

| | | | | |
|---|---|---|---|---|
| 4,387,297 A * | 6/1983 | Swartz et al. | ........... | 235/462.21 |
| 5,629,790 A * | 5/1997 | Neukermans et al. | ....... | 359/198 |
| 5,648,618 A * | 7/1997 | Neukermans et al. | .... | 73/862.08 |
| 5,714,750 A * | 2/1998 | Eastman et al. | ........ | 235/462.34 |
| 5,844,222 A * | 12/1998 | Ackley et al. | ................ | 235/454 |
| 5,867,297 A * | 2/1999 | Kiang et al. | ................. | 359/198 |
| 6,057,952 A * | 5/2000 | Kubo et al. | ................. | 359/196 |
| 6,140,979 A * | 10/2000 | Gerhard et al. | ................. | 345/7 |
| 6,245,590 B1 * | 6/2001 | Wine et al. | .................... | 438/52 |
| 6,285,489 B1 * | 9/2001 | Helsel et al. | ................. | 359/291 |
| 6,331,909 B1 * | 12/2001 | Dunfield | ..................... | 359/199 |
| 6,362,912 B1 * | 3/2002 | Lewis et al. | ................. | 359/204 |
| 6,384,406 B1 * | 5/2002 | Wine et al. | ................... | 250/234 |
| 6,390,370 B1 * | 5/2002 | Plesko | .................... | 235/462.49 |
| 6,433,907 B1 * | 8/2002 | Lippert et al. | ............... | 359/201 |
| 6,512,622 B2 * | 1/2003 | Wine et al. | ................... | 359/199 |
| 6,515,278 B2 * | 2/2003 | Wine et al. | ................... | 250/234 |
| 6,515,781 B2 * | 2/2003 | Lewis et al. | ................. | 359/204 |
| 6,525,310 B2 * | 2/2003 | Dunfield | ..................... | 250/235 |
| 7,164,810 B2 * | 1/2007 | Schnee et al. | ................ | 382/313 |
| 2002/0141026 A1 * | 10/2002 | Wiklof et al. | ............... | 359/212 |
| 2002/0158814 A1 * | 10/2002 | Bright et al. | ................... | 345/7 |
| 2003/0098352 A1 * | 5/2003 | Schnee et al. | .......... | 235/472.01 |
| 2004/0004585 A1 * | 1/2004 | Brown et al. | .................. | 345/32 |
| 2007/0272841 A1 * | 11/2007 | Wiklof | ........................ | 250/234 |

* cited by examiner

*Primary Examiner*—John R Lee
(74) *Attorney, Agent, or Firm*—Kevin D. Wills

(57) ABSTRACT

A scanned beam imager or laser scanner is operable to scan an object moving through its field-of-view. The system may include means for detecting direction and/or speed of the object. The velocity detection means may include sensors, an interface for receiving velocity information from other system elements, or image analysis that examines the skew, stretch, or compression in images. Responsive to object movement direction and speed, the scanned beam imager may alter its pixel capture rate and/or its scan rate to compensate. Alternatively or in combination, the imager may perform software-based image motion compensation. In some embodiments, the system may allow the image capture region to pace objects moving rapidly through its field-of-view.

16 Claims, 14 Drawing Sheets

METHOD AND APPARATUS FOR CAPTURING AN IMAGE OF A MOVING OBJECT

FIELD OF THE INVENTION

Embodiments according to the invention relate to scanned beam image capture devices, and more particularly to scanned beam image capture devices that capture an image or series of raster lines from a moving field-of-view.

BACKGROUND

Bar code symbols are used throughout our economy and by the government to track goods, transactions, and people. Within logistics applications, for example, goods are frequently transported past fixed-mount bar code scanners. The scanners read symbols on the goods and report the scanned symbols to a computer system that records the transaction and initiates appropriate processes. In some applications, it is desirable to move objects past fixed mount scanners at relatively high speeds. Examples include cross docking during package shipping and mail sorting, where packages are often moved on conveyor belts.

Linear charge-coupled device (CCD) cameras have been used in some high speed scanning applications. In many of these applications, the axis of the linear CCD array is placed at a right angle to the motion of the conveyor belt. A high intensity lighting system is set up to brightly illuminate the field of view (FOV) of the CCD array. Data is intermittently or continuously read out of the CCD array as the conveyor moves objects with bar code symbols past its FOV. When data is read continuously, the motion of the conveyor acts to create a vertical scan and the system may be used to capture a two-dimensional (2D) image. In some cases, the conveyor must maintain a constant velocity past the CCD FOV for the system to properly image. One drawback of the linear CCD systems is the high intensity of the illuminators and resultant high power consumption. Maximum conveyor speed is frequently determined by the lighting intensity, the distance the lights and camera must be placed from the surface, and/or the data rate out of the CCD array.

Scanned beam systems in the form of conventional linear (1D) bar code scanners have been in use since the early 1970s as fixed mount devices such as those used in grocery stores. By the early 1980s, scanned beam systems had been adapted to hand held form as several bar code companies introduced helium-neon laser based hand held scanners. Most commonly called laser scanners, such systems scan a laser beam over a surface and measure the light reflected from the beam. The pattern of received light is called a scan reflectance profile and may be processed to decode bar code symbols through which the beam is scanned.

Laser scanners are generally regarded to have several advantages over CCD scanners. Because the laser beam provides its own illumination, a separate, power consuming bank of lights is not required. Collimation of the beam results in a power loss proportional to the inverse square of the distance to the surface rather than proportional to the inverse fourth power as in flood-illuminated cameras. Collimation can also result in greater depth of field (DOF) than CCD systems that must operate with large apertures to maximize light gathering efficiency. Finally, since laser scanners provide intrinsic illumination, alignment of the illuminator FOV with an illuminator FOV is not a problem, allowing for faster installation and greater system mobility.

While laser scanners have been used extensively in low speed fixed-mount environments, they have not heretofore proved successful in high speed imaging applications such as the high speed conveyor applications described above. Due in part to lack of beam position feedback, they have also frequently suffered from scan rates insufficient to capture all lines in a FOV.

With respect to hand held applications, lasers have often proved superior to focal plane sensor-based technologies such as charge-coupled device (CCD) and complementary metal oxide semiconductor (CMOS) sensor arrays, particularly with respect to aiming, depth-of-field, motion blur immunity, and low peak power consumption. Unfortunately, lasers have not been widely adapted to image capture applications such as reading (2D) matrix symbols, signature capture, etc. Instead, they have been relegated to reading only linear or 2D stacked bar code symbols. This again is due in part to lack of beam position information, and scan rates to slow to capture all pixels in a FOV.

OVERVIEW

Embodiments according to the present invention relate to beam scanning systems and particularly imagers or raster scanners based on scanned laser beams.

In one set of related aspects, methods are taught for compensating for relative motion between the imager and its FOV. Depending upon the relative directions of the nominal scan axes and the apparent motion, the methods used may be changed.

In another aspect, an apparatus includes one or more embodiments of the motion compensation methods.

In one embodiment, a laser scanner includes a scan axis parallel to the relative motion of the FOV. The rate of scan in that axis can be modified to maximize image quality and readability of bar code symbols in the FOV.

In another embodiment, a material handling system includes a 2D laser scanner that enables it to vary and even reverse conveyor direction without negatively impacting the image quality captured by the scanner.

In another embodiment, a fixed mount laser scanner allows a high relative motion of the FOV, and hence higher throughput of objects passing therethrough.

DETAILED DESCRIPTION

Figure 1:
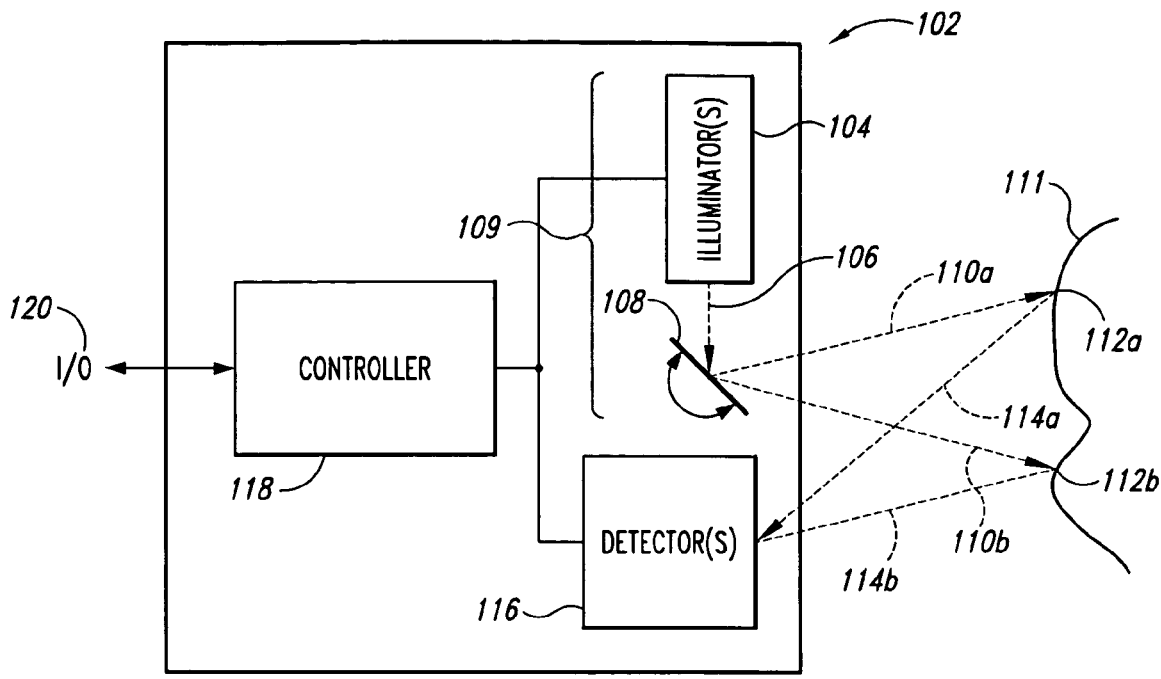
FIG. 1 is a block diagram of a simple scanned beam imager according to an embodiment.

FIG. 1 shows a simplified block diagram of a scanned beam imager 102 according to an embodiment. An illuminator 104 creates a first beam of light 106. A scanner 108 deflects the first beam of light across a field-of-view (FOV) to produce a second scanned beam of light 110. Taken together, illuminator 104 and scanner 108 comprise a beam scanner 109. Instantaneous positions of scanned beam of light 110 may be designated as 110a, 110b, etc. The scanned beam of light 110 sequentially illuminates spots 112 in the FOV. Spots 112a and 112b in the FOV are instantaneously illuminated by scanned beam position 110a and 110b, respectively, scattering or reflecting the light energy. One or more detectors 116A receive a portion of the scattered light energy. The one or more detectors 116 convert(s) the light to electrical signals from which controller 118 builds up an image and transmits it for further processing, decoding, archiving, and/or display via interface 120.

Light source 104 may include multiple emitters such as, for instance, light emitting diodes (LEDs), lasers, thermal sources, arc sources, fluorescent sources, gas discharge sources, or other types of illuminators. In one embodiment, illuminator 104 comprises a red laser diode having a wavelength of approximately 635 to 670 nanometers (nm). In another embodiment, illuminator 104 comprises three lasers; a red diode laser, a green diode-pumped solid state (DPSS) laser, and a blue DPSS laser at approximately 635 nm, 532 nm, and 473 nm, respectively. Light source 104 may include, in the case of multiple emitters, beam combining optics to combine some or all of the emitters into a single beam. Light source 104 may also include beam-shaping optics such as one or more collimating lenses and/or apertures. Alternate light sources may use different or additional optical components for beam shaping, filtering, and other optical parameters.

Light beam 106, while illustrated as a single beam, may comprise multiple beams converging on one or more scanners 108.

Scanner 108 may be formed using many known technologies such as, for instance, a rotating mirrored polygon, a mirror on a voice-coil as is used in miniature bar code scanners such as used in the Symbol Technologies SE 900 scan engine, a mirror affixed to a high speed motor or a mirror on a bimorph beam as described in U.S. Pat. No. 4,387,297 entitled PORTABLE LASER SCANNING SYSTEM AND SCANNING METHODS, an in-line or "axial" gyrating, or "axial" scan element such as is described by U.S. Pat. No. 6,390,370 entitled LIGHT BEAM SCANNING PEN, SCAN MODULE FOR THE DEVICE AND METHOD OF UTILIZATION, a non-powered scanning assembly such as is described in U.S. patent application Ser. No. 10/007,784, SCANNER AND METHOD FOR SWEEPING A BEAM ACROSS A TARGET, commonly assigned, a MEMS scanner, all incorporated herein by reference, or other type. Alternatively, the scanner 108 may be a MEMS scanner, such as those described in U.S. Pat. Nos. 5,629,790 and 5,648,618, to Neukermans et al., U.S. Pat. No. 5,867,297 to Solgaard, et al., and U.S. Pat. No. 6,057,952 to Dickensheets, et al., each of which is incorporated herein by reference. The scanner 108 may include acousto-optic components, electro-optic components, spinning polygons or other types of scanning elements.

A MEMS scanner may additionally be of a type described in U.S. Pat. No. 6,140,979, SCANNED DISPLAY WITH PINCH, TIMING, AND DISTORTION CORRECTION; U.S. Pat. No. 6,245,590, FREQUENCY TUNABLE RESONANT SCANNER AND METHOD OF MAKING; U.S. Pat. No. 6,285,489, FREQUENCY TUNABLE RESONANT SCANNER WITH AUXILIARY ARMS; U.S. Pat. No. 6,331,909, FREQUENCY TUNABLE RESONANT SCANNER; U.S. Pat. No. 6,362,912, SCANNED IMAGING APPARATUS WITH SWITCHED FEEDS; U.S. Pat. No. 6,384,406, ACTIVE TUNING OF A TORSIONAL RESONANT STRUCTURE; U.S. Pat. No. 6,433,907, SCANNED DISPLAY WITH PLURALITY OF SCANNING ASSEMBLIES; U.S. Pat. No. 6,512,622, ACTIVE TUNING OF A TORSIONAL RESONANT STRUCTURE; U.S. Pat. No. 6,515,278, FREQUENCY TUNABLE RESONANT SCANNER AND METHOD OF MAKING; U.S. Pat. No. 6,515,781, SCANNED IMAGING APPARATUS WITH SWITCHED FEEDS; and/or U.S. Pat. No. 6,525,310, FREQUENCY TUNABLE RESONANT SCANNER; for example; all incorporated herein by reference.

Scanner 108 may also include a pair of orthogonally positioned scanning devices, each including a respective reflective component that oscillates at a respective frequency.

Alternatively, illuminator 104, scanner 108, and/or detector 116 may comprise an integrated beam scanning assembly as is described in U.S. Pat. No. 5,714,750, BAR CODE SCANNING AND READING APPARATUS AND DIFFRACTIVE LIGHT COLLECTION DEVICE SUITABLE FOR USE THEREIN, incorporated by reference herein.

Other beam scanning technologies may be usable or preferable, depending upon the application and system.

In the case of a 2D scanned-beam imager, scanner 108 is driven to scan output beams 110 along a plurality of axes so as to sequentially illuminate a 2D FOV 111.

For the case of 2D imaging, a silicon MEMS scanner is one embodiment, owing to the high frequency, durability, repeatability and energy efficiency of such devices. In such a case, a single-crystal silicon MEMS scanner may be preferable because of its lack of fatigue life, among other things.

A 2D MEMS scanner 108 scans one or more light beams at high speed in a pattern that covers an entire 2D FOV within a frame period. A typical frame rate may be 60 Hz, for example. In some embodiments, it may be advantageous to run one or both scan axes resonantly. In one embodiment, one axis is run resonantly at about 19 KHz while the other axis is run non-resonantly in a sawtooth pattern so as to create a progressive scan pattern. For example, in an imager using progressively scanned bi-directional lines and a single beam, a horizontal bi-sinusoidal scan frequency of approximately 19 KHz and vertical sawtooth pattern at 60 Hz can approximate SVGA resolution. The horizontal scan motion may be driven electrostatically and the vertical scan motion driven magnetically. In alternative embodiments, both axes may be driven magnetically. Other actuation technologies will be apparent to one skilled in the art.

Detectors 116 may comprise several different forms. In one embodiment, a simple PIN photodiode connected to an amplifier and digitizer may be used. In the case of multi-color imaging, the detector 116 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

Simple photodetectors such as PIN photodiodes, APDs, and PMTs may be arranged to stare at the entire FOV, stare at a portion of the FOV, collect light retrocollectively, or collect light confocally, depending upon the application. In some embodiments, the photodetector 116 collects light through filters to eliminate much of the ambient light.

The present device may be embodied as monochrome, as full-color, and even as a hyper-spectral. In some embodiments, it may be desirable to add color channels between the conventional RGB channels used for many color cameras. Herein, the term grayscale and related discussion shall be understood to refer to each of these embodiments as well as other, unmentioned embodiments. In the control apparatus and methods described below, pixel gray levels may comprise a single value in the case of a monochrome system, or may comprise an RGB triad or greater in the case of color or hyperspectral systems.

Figure 2:
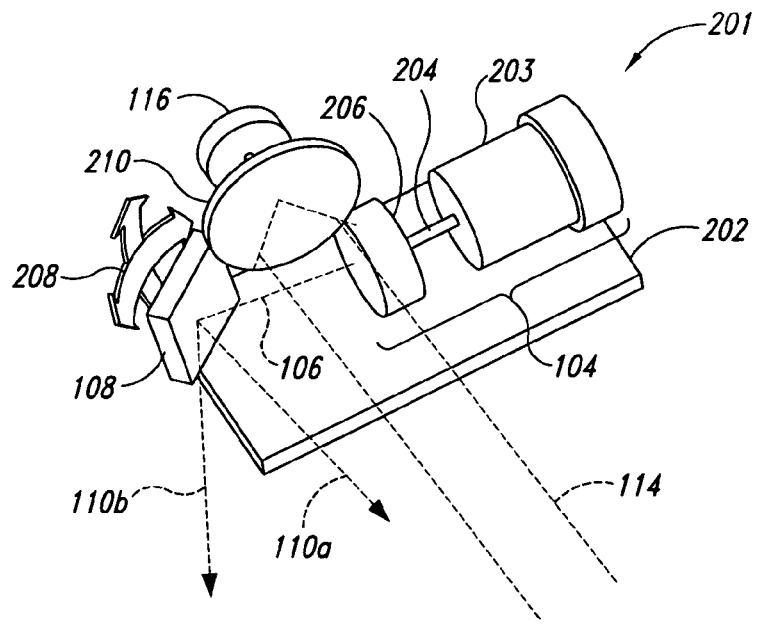
FIG. 2 is an isometric view of a scanned beam imaging engine according to an embodiment.

FIG. 2 is an isometric view of an imaging engine according to an embodiment. FIG. 2 shows a scanned beam imager 201 having a single non-pixelated detector. Chassis 202 carries illuminator assembly 104. Illuminator assembly 104 comprises an emitter 203 that emits raw beam 204. Emitter 203 may be a laser diode such as a monochrome laser diode with peak emission at approximately 635 to 670 nm. Raw beam 204 is shaped by beam optics 206, which may for instance comprise a collimating lens and an aperture, to produce first beam 106. First beam 106 is reflected by scanning mirror 108, here shown as deflecting beam 106 in two axes, as indicated by rotation angles 208, to produce two dimensionally scanned beam 110. Two instantaneous positions of scanned beam 110 are shown as beam 110a and 110b. Instantaneous reflected or scattered beam 114, is collected by optional collection optic 210 which focuses scattered beam 114 onto detector 116, here shown as a photodiode.

Return beam 114 is shown as having width. This is indicative of the gathering effect of optional collection optic 210, which serves to increase the subtended angle over which the scattered light may be collected, increasing the numerical aperture and therefore the intensity of the collected signal. It may thus be seen that detector 116 is non-imaging in this embodiment. That is, detector 116 is a staring detector that simply collects all light scattered from the FOV. To improve the signal-to-noise ratio (SNR), it is often advantageous for collection optic 210 to include a filter to exclude wavelengths not scanned, fluoresced, or otherwise indicative of FOV response to scanned beam 110.

As an alternative or in addition to a staring detector 116, scanned beam imager 201 may use confocal or retrocollective collection of return beam 114. Confocal and retrocollective collection schemas may de-scan the return signal with the scanning mirror or a synchronized scanning mirror, thus using spatial filtering to ensure the return signal is dominated as much as possible by the scanning spot. Confocal systems detect through an aperture that is arranged confocally to the beam source, thus detecting over a reduced DOF for maximum resolution. Retrocollective systems collect light from around and on the scanning spot, resulting in a balance between maximum signal isolation and maximum DOF.

Figure 3:
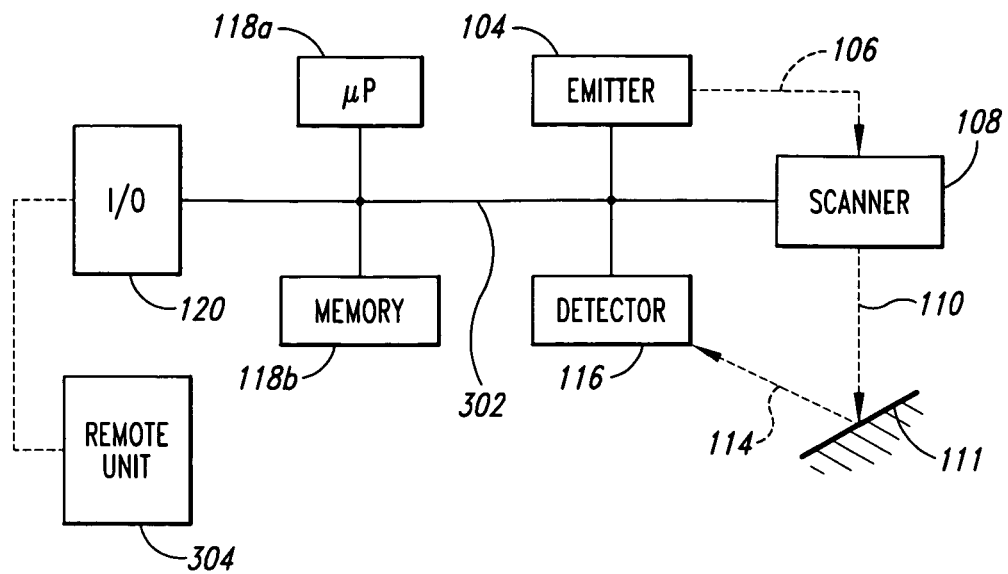
FIG. 3 is another block diagram of a scanned beam imager according to an embodiment.

FIG. 3 is an electrical block diagram showing one embodiment, drawing particular attention to the distribution of controller 118 into microprocessor 118a and memory 118b blocks connected to one another and to emitter 104, scanner 108, and detector 116 by buss 302. Interface block 120 may for instance include wired and wireless data interfaces; visible indicators, audio indicators, tactile indicators, and/or displays; input means such as temperature sensors, ambient light sensors, trigger, orientation and/or location sensors, remote memory or storage, a keyboard, mouse, microphone, and/or other devices for communicating operatively relevant information.

Optional remote unit 304 may be connected to interface 120 by wired or wireless means including a networked or Internet connection. The nature of remote unit 304 may be determined based on application requirement. For example, a remote expert comprising artificial intelligence and/or human intelligence may be useful when the embodiment involves image analysis or abstract decision-making. A remote decoder may be used to advantage in bar code or OCR reading applications. One embodiment particularly relevant to the present invention is the remote unit including a sortation system comprising diverters and other material handling equipment. Multiple imagers may be networked to one or a plurality of remote units.

Figure 4:
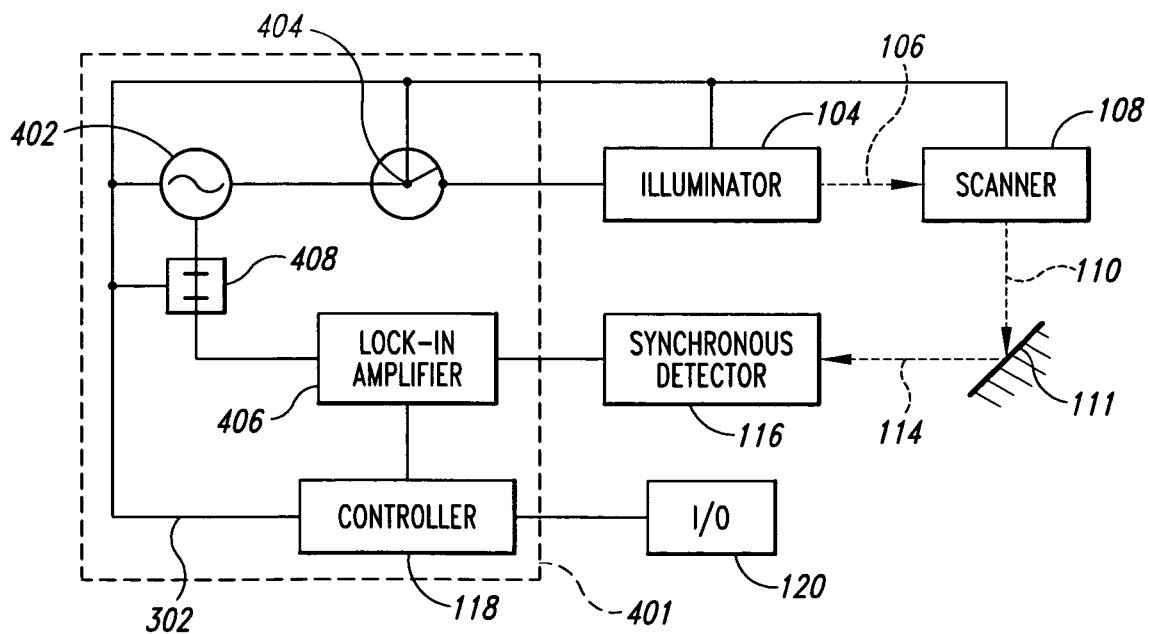
FIG. 4 is a block diagram of a laser scanner that uses synchronous detection according to an embodiment.

FIG. 4 is a block diagram of an embodiment that uses a synchronous illuminator and detector, according to an embodiment. Timer-controller 401 controls the synchronization of the illuminator(s) 104 and detector(s) 116.

Embodiments related to FIG. 4 pulse the illuminator. The detector is then "tuned" to the pulse rate of the illuminator. Timer-controller 401 comprises an RF source 402 that may be controlled by controller 118. RF source 402 modulates the illuminator 104, which outputs a modulated beam 106 that is deflected by scanner 108 to produce scanned beam 110. In some embodiments, illuminator 104 is a red laser diode of the type typically used in bar code scanners, for example a red laser diode having a wavelength between 635 and 670 nanometers with a rated power output of 10 to 30 milliwatts.

Scanner 108 may be one or a combination of several types of scanners if capable of producing an appropriate scan rate. In some embodiments, scanner 108 is a MEMS mirror.

Scanned beam 110 scans FOV 111 and is reflected or scattered back as reflected beam 114 to synchronous detector 116. Synchronous detector 116 is tuned to detect the pulse modulation frequency of illuminator 104. Light may be collected at detector 116 by collection optics (not shown). Collection may be made retrocollectively, wherein the beam is de-scanned by the scanning mirror 108, or may be made via staring optics. The staring optics may use reflectors, lenses, filters, vignetting structures, or combinations thereof. Nonimaging collection optics are described in the book entitled "High Collection Nonimaging Optics" by W. T. Welford and R. Winston, 1989, Academic Press, incorporated herein by reference.

One way to tune a detector to a pulse modulation frequency is to use lock-in amplifier 406, which amplifies a signal at one or more particular frequencies. Lock-in amplifier 406 may include circuitry to convert the detected modulated signal to base band or, alternatively, may pass a modulated signal to the controller. The controller converts the signal into an image and performs other necessary functions appropriate for the application.

Lock-in amplifier 406 is of the type that is sensitive to one or more particular frequencies. The frequency or frequency range to which the lock-in amplifier is sensitive may be predetermined or the RF source 402 may optionally be fed back to the lock-in amplifier. The RF source may be fed back to the lock-in amplifier via optional delay line 408. Optional delay line 408 may optionally be a variable delay line controlled by controller 118. Lock-in amplifier 406 may be of a design that locks into the frequency of the illuminator pulse modulation and follows it through any variation. One type of such design is a phase-locked loop, which may be implemented as a heterodyne design.

Optional modulator 404 may apply modulation to the RF signal generated by RF source 402, thus driving illuminator 104 with a modulated RF signal. Some or all of RF source 401, optional modulator 404, illuminator 104, scanner 108, synchronous detector 116, lock-in amplifier 406, optional delay line 408, and optional interface 120 may be under control of controller 118, for example via control lines 302.

The RF drive signal produced by timer-controller 401 effectively produces a carrier frequency that tunes illuminator 104 and synchronous detector 116 to each other and helps to reject ambient noise and provide other benefits, some of which are described herein.

Scanned beam imagers often have data rates on the order of 20 MHz. One way to operate a synchronous detector with a scanned beam imager is to pulse the beam at a frequency that is high compared to the data rate. For instance, the beam may be modulated at a rate of 20 to 200 times the data rate, resulting in a pulse rate of 400 MHz to 4 GHz. Such high pulse rates can be a challenge for detectors, however, often resulting in significant photon shot noise as well as practical design difficulties. In some embodiments, the pulse rate may be run at a small multiple of data rate, for example at 1 to 10 times the data rate, resulting in a more manageable pulse rate of 20 to 200 MHz.

The device of FIG. 4 may operate at a pre-determined pulse frequency. It may desirable, particularly in low frequency multiple embodiments, to maintain a constant phase relationship between pixel clocking and synchronous pulse modulation in order to ensure an equal number of pulse modulation cycles. However, preferred resonant scanning technologies do not have constant rotational velocities.

For resonant scanning systems, constant frequency pulse modulation may be used with constant pixel clock rate and variable pixel spacing. In this mode, it may be desirable to apply image processing to interpolate between actual sample locations to produce a constant pitch output. In this case, the addressability limit is set at the highest velocity point in the scan as the beam crosses the center of the FOV. More peripheral areas at each end of the scan where the scan beam is moving slower are over-sampled. In general, linear interpolation, applied two-dimensionally where appropriate, has been found to yield good image quality and have a relatively modest processing requirement. U.S. Provisional patent application Ser. No. 10/441,916 filed May 19, 2003 and entitled APPARATUS AND METHOD FOR BI-DIRECTIONALLY SWEEPING AN IMAGE BEAM IN THE VERTICAL DIMENSION AND RELATED APPARATI AND METHODS, incorporated herein by reference, teaches methods of interpolating pixel values, particularly with respect to bi-sinusoidal scanning.

Alternatively, constant pixel spacing may be maintained by varying pixel clocking and synchronous pulse modulation frequency. Methods and apparatus for varying pixel clocking across a FOV are described in U.S. patent application Ser. No. 10/118,861 entitled ELECTRONICALLY SCANNED BEAM DISPLAY, incorporated herein by reference. By using a clock divider (for frequency ratios greater than 1:1), one may use the apparatus disclosed therein to also control pulse modulation frequency synchronously with pixel clocking.

Varying the pulse modulation frequency sinusoidally produces a chirp that may be useful for further improving noise immunity. In effect, this creates frequency diversification that acts in a manner similar to spread spectrum radio systems. This may be particularly useful when two or more of the systems of FIG. 4 are used in proximity to one another.

Pulse modulation frequency diversification may also or alternatively be implemented by varying the ratio of modulation frequency to pixel frequency. This may be done on a frame-by-frame, line-by-line, or even a pixel-by-pixel basis. This type of modulation frequency diversification is particularly akin to frequency hopping spread spectrum radio systems. A programmable clock divider may be used to set the frequency ratio.

Figure 5:
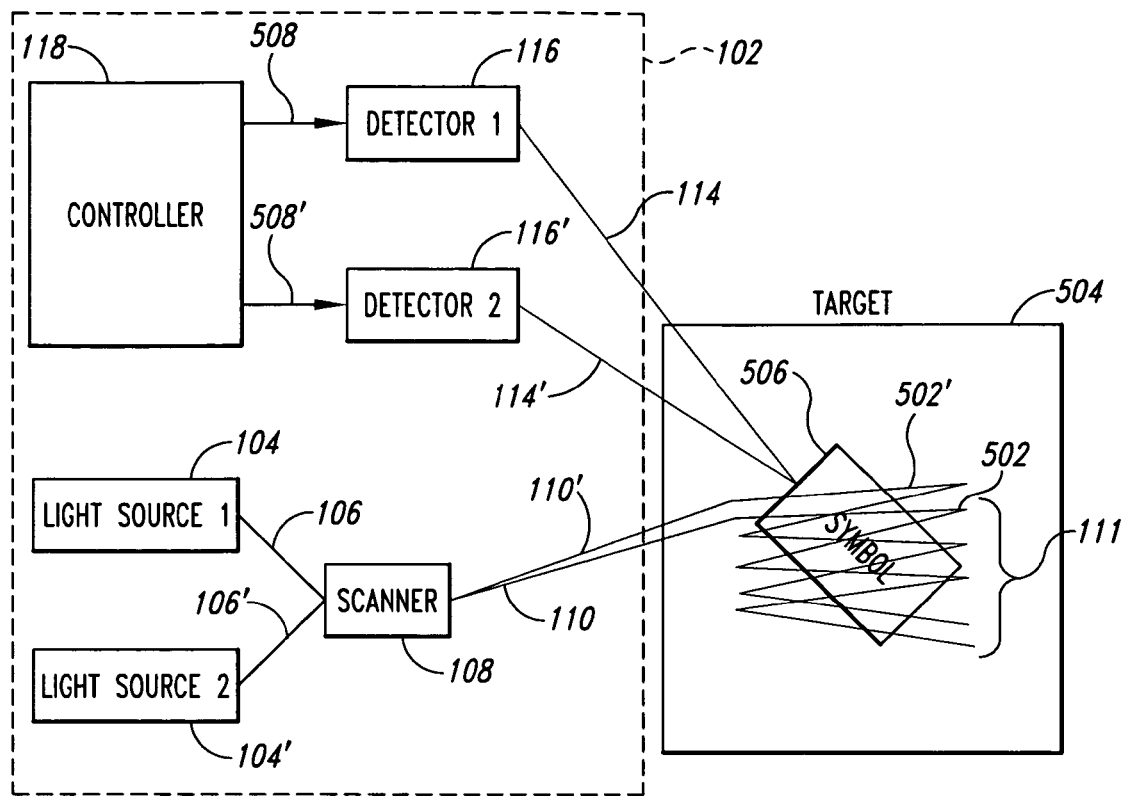
FIG. 5 is a block diagram illustrating a scanned beam imager having two light sources and two detectors according to an embodiment.

FIG. 5 shows an electronic imager 102 in which a first light source 104 projects a first light beam 106 toward a scanner 108, according to an embodiment. Additionally, a second light source 104' projects a second light beam 106' toward the scanner 108.

Scanner 108 receives the first light beam 106 and the second light beam 106' and redirects them in respective first and second scanned beams 110 and 110'. First and second scanned beams 110 and 110' are scanned in first and second scan patterns 502 and 502', respectively, across combined FOV 111. In some applications, scanned beam imager 102 is oriented such that the scan patterns 502 and 502' illuminate a FOV 111 comprising all or a portion of an outer surface of a target object 504. While the patterns 502 and 502' shown in FIG. 5 are raster patterns, it will be appreciated by those of skill in the art that the light beams can be redirected in other scan patterns including linear, circular, vector, and other patterns.

The outer surface of the target object 504 bears a machine readable indicia 506 that may be one or more conventional linear or one-dimensional (1D) bar code symbols such as CODE 30, Code 128, UPC/EAN, Interleaved 2/5, etc.; one or more two dimensional (2D) bar code symbols including stacked 2D symbols such as PDF-417, Code 49, Code 16K, or Codablock, for example, and 2D matrix symbols such as Data Matrix, Code One, MaxiCode, QR Code, etc; composite symbols such as those in the RSS family for example; OCR; bumpy bar code; a laser card, or others. Typically, such symbols have regions of differing optical properties that are patterned according to information to be represented. While the embodiment described with respect to FIG. 5 depicts a 1D or 2D symbol, the concepts herein are not limited to such symbols. Instead, many of the concepts described herein can apply to capturing other types of images.

Returning to the structure of FIG. 5, the symbol 506 reflects a portion of the light from the first and second light beams 110 and 110', depending upon the respective reflectivities of the regions struck by the beams. As represented by beams 114 and 114', portions of the reflected light strike a pair of detectors 116 and 116'.

The amount of reflected light incident upon the detectors is dependent upon several factors including wavelength, scanner position, detector position, any associated gathering optics, and the reflectivity of the symbol 506. Responsive to the light 114 and 114', each of the detectors 116 and 116' produce a respective electrical signal 508 and 508'. Detectors 116 and 116' may be conventional electronic devices, such as a PIN photodiode, avalanche photodiode, photomultiplier tube, or a CCD.

A controller 118 receives the signals 508 and 508' and converts the received signals into a digital image of the symbol 506, i.e., the areas of the symbol that reflect the scanned light beams 110 and 110' onto the detectors 116 and 116'. The controller or another component such as a digital signal/image processor employs the digital representation of the received signals to identify information represented by the symbol 506. For example, the controller may identify the target object 504 or may determine characteristics such as a shipping date, destination, or other information. Alternatively, the identified information may not pertain directly to the target object 504. For example, where the target object 504 is an identification card, the symbol may provide information about the holder.

The first and second light sources 104 and 104' may be oriented such that each of the light beams 106 and 106' converge upon the scanner 108 along slightly different angles or vectors. In one embodiment, first and second light sources 104 and 104' are wavelength division multiplexed (WDM). Scanning beams 110 and 110' then diverge as they travel away from the scanner 108 to strike the target object 504 at slightly offset locations. As scanner 108 sweeps beams 110 and 110' onto symbol 506, their respective scan patterns are offset (interlaced). The interlacing of the two scan patterns can increase the resolution of the digital image by sampling the reflectivity of two locations simultaneously.

While the embodiment of FIG. 5 includes two light sources, the invention is not so limited. Some configurations may employ three or more light source/detector pairs in a "multi-line" reading approach, as will be described below with reference to FIGS. 6 and 7. For a given scan angle and frequency, the inclusion of additional light sources and detectors can further increase the resolution of the image. Also, while the above-described embodiment incorporates a single scanner, structures with more than one scanner are within the scope of the invention. For example, the light beams 106 and 106' could be directed toward separate scanners having reflective components that oscillate at the same frequency or at different frequencies.

Figure 6:
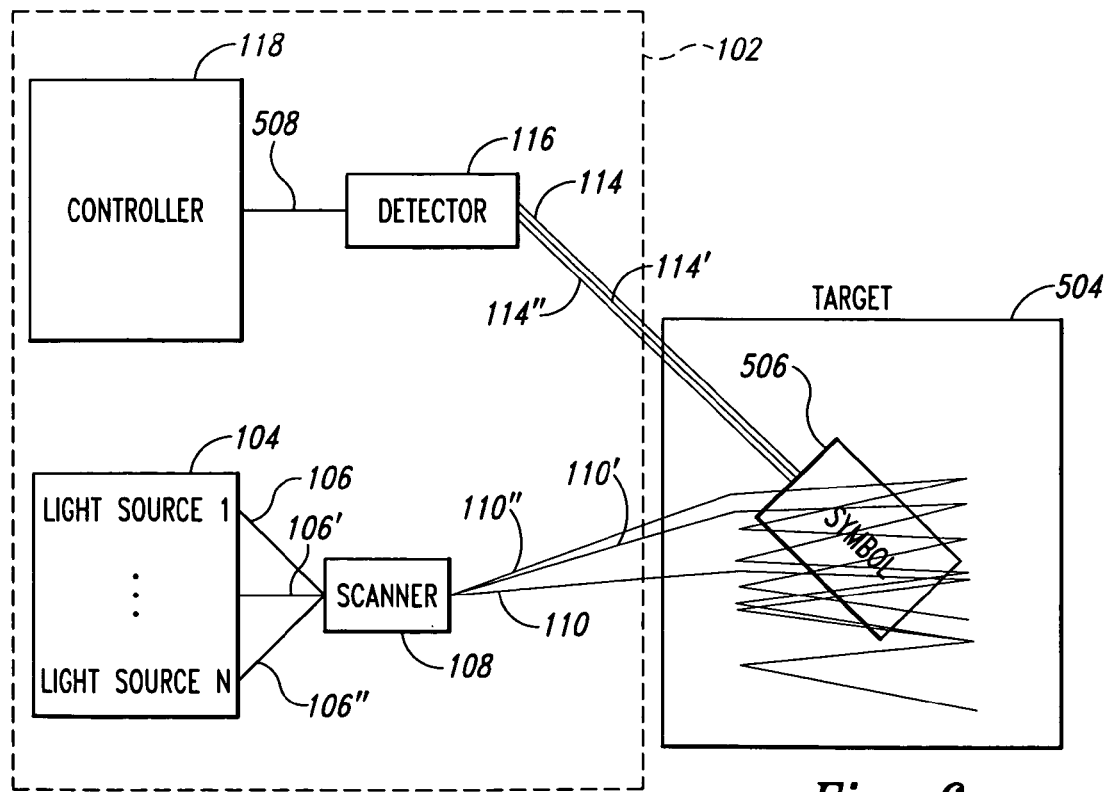
FIG. 6 is a block diagram of an alternative embodiment of an electronic imager.

FIG. 6 is a block diagram of an alternative embodiment of an electronic imager. The outer surface of target object 504 bears a reflective symbol 506. Symbol 506 reflects a portion of the light from light beams 110, depending upon the respective reflectivities of the regions struck by beams 110. As represented by arrows 114, 114', and 114'', portions of the reflected light strike detector 116.

Responsive to light 114, detector 116 produces a respective electrical signal 508. In one embodiment, detector 116 uses synchronous demodulation to distinguish the reflected light. A detector that can discriminate between the reflected light may be used. For example, the detector may be a conventional electronic device, such as a photodiode or a CCD configured to discriminate the reflected light.

Light sources 104 are oriented such that each of light beams 106 converge upon scanner 108 along slightly different angles or vectors. According to one embodiment, light sources 104 are frequency modulated to provide separable frequency division multiplexed signals, or FDM signals. Alternatively, the light sources are time-sliced modulated to produce TDM signals. The reflected beams 110 then diverge as they travel away from the scanner 108 to strike the target object 504. In one embodiment, the reflected beams 110 are slightly offset from each other. In another embodiment, the reflected beams 110 are not offset. As the scanner 108 sweeps the beams 110 onto the symbol 506, their respective scan patterns are interlaced. The interlacing of the scan patterns can increase the resolution of the digital representation of the symbol by sampling the reflectivity of two locations simultaneously.

Figure 7:
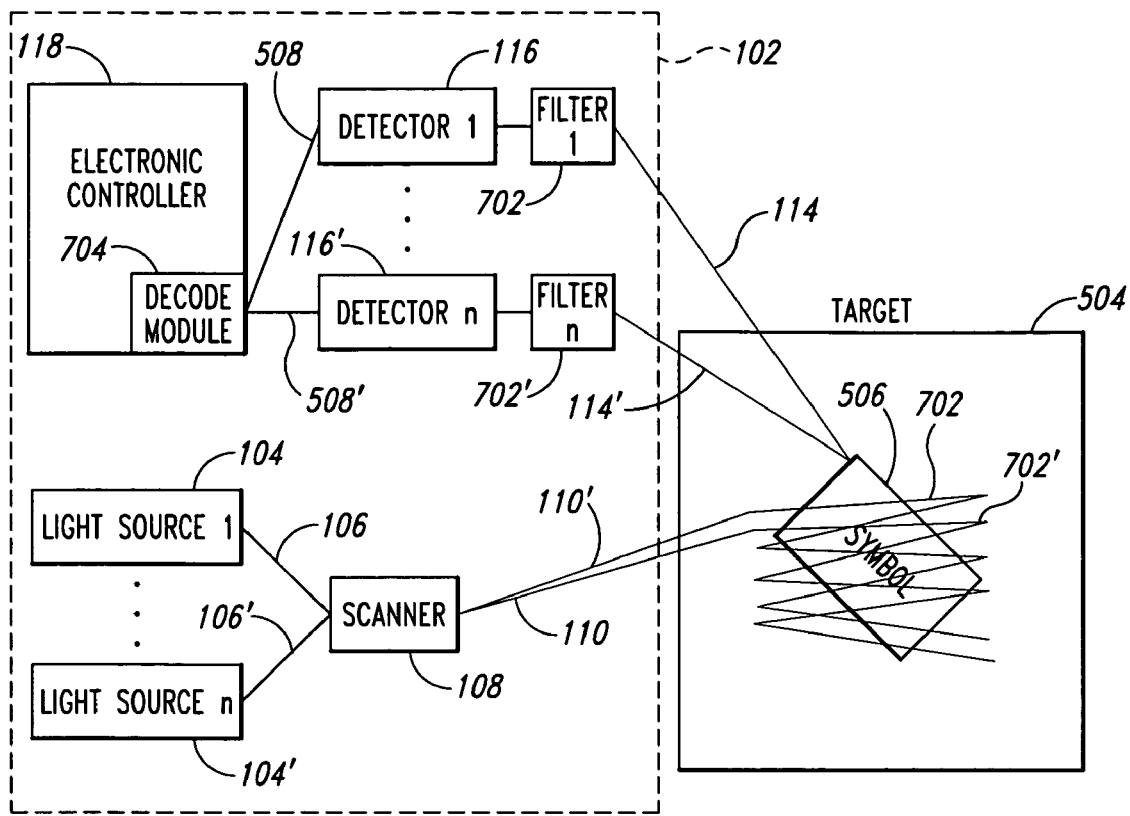
FIG. 7 is a block diagram of another alternative embodiment of a scanned beam imager.

FIG. 7 is a block diagram of another alternative embodiment of a scanned beam imager 102 having a plurality of light sources. Each of the "n" light sources 104 projects a beam of light 106 towards at least one scanner 108. As with the previously described embodiment, scanner 108 may utilize oscillating reflective components rotating about two orthogonal axes, although other types of scanners may be utilized. The scanner 108 redirects the "n" light beams 106 towards a target object 504 such that the "n" light beams scan "n" patterns 702, 702', etc. simultaneously on a target object 504 in accordance with the oscillations and disposition of the reflective component of the scanner.

The target object 504 includes a symbol 506 with areas of differing reflectivity. The "n" detectors 116 are oriented to receive at least a portion of the light 114 reflected from the symbol 506. The amount of light received by each detector 116 may correspond to the reflectivity of the symbol areas illuminated by all or most of the respective beams 110.

To permit the detectors 116 to discriminate between light reflected from each respective area of the target object 504, each of the "n" light sources 104 emits light at a respective wavelength different from the other light sources. Accordingly, each of the "n" detectors 116 has a wavelength selectivity tuned to its corresponding light source, such that each detector 116 can selectively detect light from its corresponding light source.

Responsive to the light reflected from its corresponding area of symbol 506, each detector 116 produces a signal 508 indicative of the reflectivity of the corresponding illuminated area. A controller 118 receives the signals and converts them into digital representations of the areas scanned by each respective beam. Further signal processing can then reconstruct, from the various digital representations, information represented by the symbol 506.

As shown, the "n" light sources 104 are oriented such that each of the "n" light beams 106 converges at the scanner 108 along a respective vector. As the beams 110 exit the scanner 108, they diverge slightly according to their respective arrival vectors. The slightly diverging beams strike the target object 504 substantially simultaneously and, as the scanner sweeps through its scan pattern, each of the "n" beams traces a respective scan pattern 702, 702', etc. on the target object 504. The "n" scan patterns 702 are therefore effectively interlaced and the "n" light sources 104 produce "n" light beams 106 that are scanned as "n" light beams 110 to illuminate separate areas of the symbol 506 located on target object 504.

The wavelengths of different light beams projected by the light sources described herein may be visible light. Other non-visible light wavelengths, such as ultraviolet or infrared, may be used in place of or in conjunction with visible light.

To permit the detectors 116 to respond to their respective light sources, a respective one of "n" filters 702 is positioned in an optical path between the corresponding detector 116 and the target object 504. Each filter is transmitting at a desired set of wavelengths and non-transmitting at undesired wavelengths. In this way, each of the "n" detectors can respond selectively to light of interest and ignore light of less interest. A decode module 704, may be located separately or within the controller 118 to process the digital representations of the signals and identify information associated with the symbol 506.

While the embodiment described herein uses wavelength of the light sources and detectors as a basis for discriminating between light illuminating each respective area of the target object 504, other approaches may be used. For example, the light sources may be modulated at respective frequencies. The outputs of the detectors can then be synchronously demodulated to indicate the reflectivity of the respective illuminated areas. In some applications of this approach, a single detector with a sufficiently broad frequency response may receive the reflected light. Synchronous demodulation can then isolate each of the modulated components.

Figure 8:
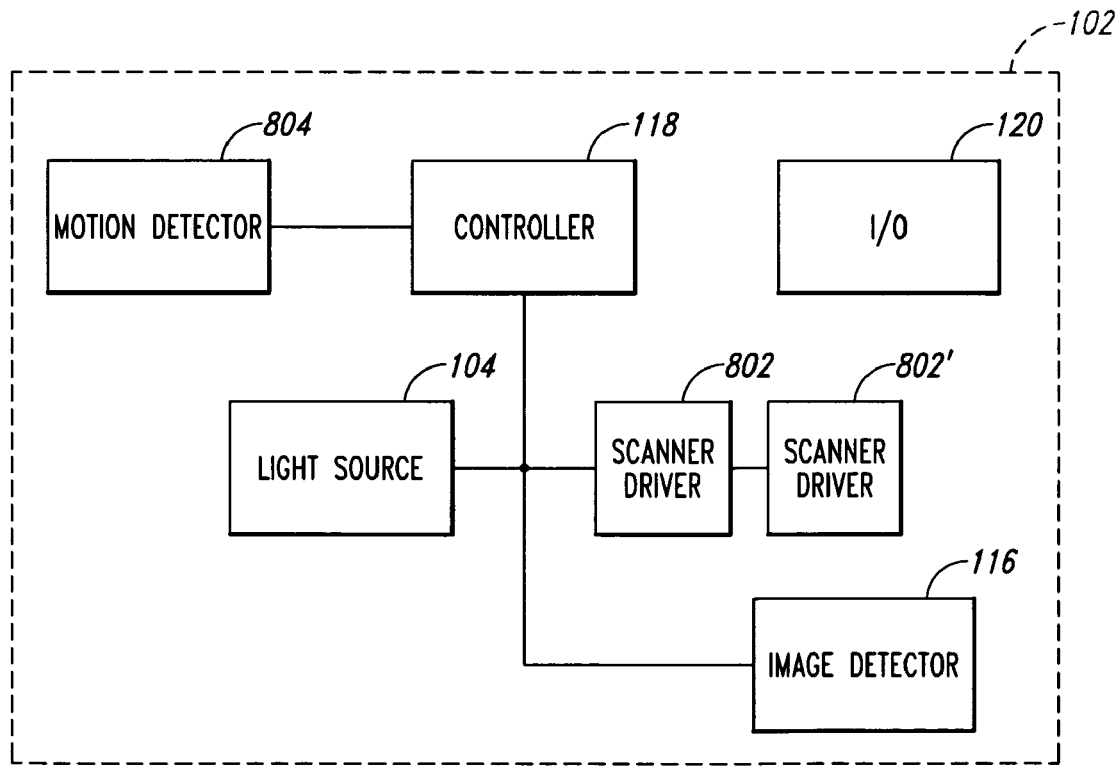
FIG. 8 is a block diagram of a scanned beam imager with a motion detector according to an embodiment.

FIG. 8 is a hardware block diagram illustrating an imager 102 that provides motion compensation by automatically adjusting to the movement of an object within the field of view of the imager, according to an embodiment. A light source 104 projects light at a scanner 108 that is positioned by a scanner driver 802, optional second scanner driver 802', and an electronic controller 118. The scanner driver 802 (and optionally second scanner driver 802') causes the scanner 108 to reflect scanned light beams from the scanner onto a symbol (not shown). Separate scanner drivers may be desirable when two scanning axes are caused by separate scanning devices, for example. Alternatively, the imager may integrate both driving functions into a single driver, or further segregate scanner driving into more than two drivers.

An image detector 116 receives light reflected off the reflective areas of the symbol and produces an electrical output corresponding to the reflectivity of a region being illuminated by the scanned beam. The controller 118 provides electrical signals that control the operation of the scanner 108, scanner driver 802 (and optionally to second scanner driver 802', light source 104, and image detector 116. Additionally, the controller 118 may provide information regarding these components to the motion detector 804. In turn, the motion detector 804 provides feedback information to the controller, which uses this information to adjust the operation of the scanner. The motion detector 804 may comprise various components including an image processor to detect change in a position of the target object from one frame to the next, manual input keys for an operator to input field-of-view velocity, a transducer to measure velocity, for example from a moving conveyor belt, an interface to receive velocity information from a device that controls velocity, such as a printing press for example, etc. Transducers may include many known velocimeters or velocity measurement devices including a an encoder wheel, a Doppler device, a magnetic or optical pickup, etc. Additionally, other technologies not listed may be used depending upon the system and application.

In another embodiment, a separate motion detector 804 may not be included and, instead, software could be employed to provide substantially the same functionality to detect motion of the target object and/or adjust the operation of the scanner. For some applications, it may be preferable to detect motion directly from the image. In some applications, feature locations of the image of the symbol can be repeatable and certain features of interest have, or may be assumed to have, straight lines by the invention. Also, in other applications, feature location information can be employed by the invention to determine and adjust for movement of the image of a target object.

Figure 9:
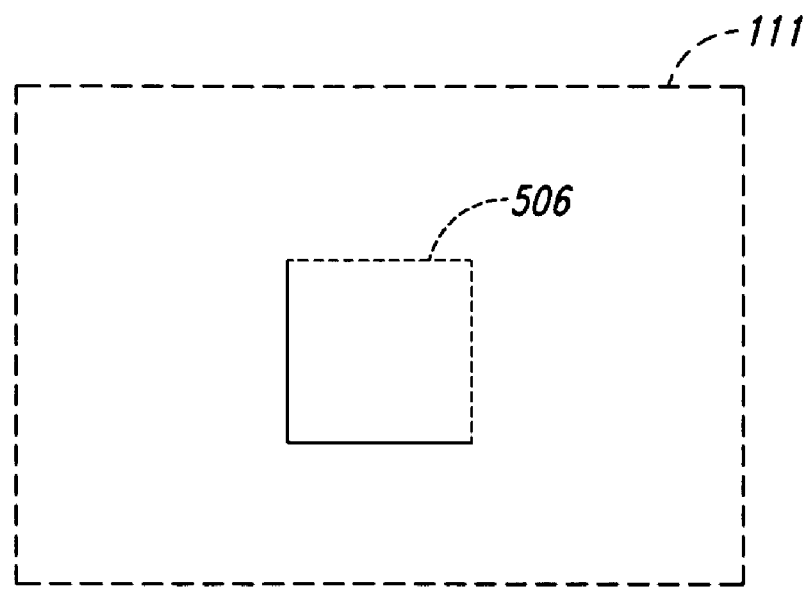
FIG. 9 illustrates a field-of-view with an illustrative undistorted 2D bar code symbol in it.

FIG. 9 illustrates an exemplary symbol that may be within the field-of-view 111 of an imager. Symbol 506 is a Data Matrix symbol that is nominally square. That is, printing specifications for the symbology provide a priori knowledge that the nominal shape of the symbol is square. The outer dimensions of the symbol are equal to one another in both the x- and y-axes and the cell size is equal in both axes.

Figure 10:
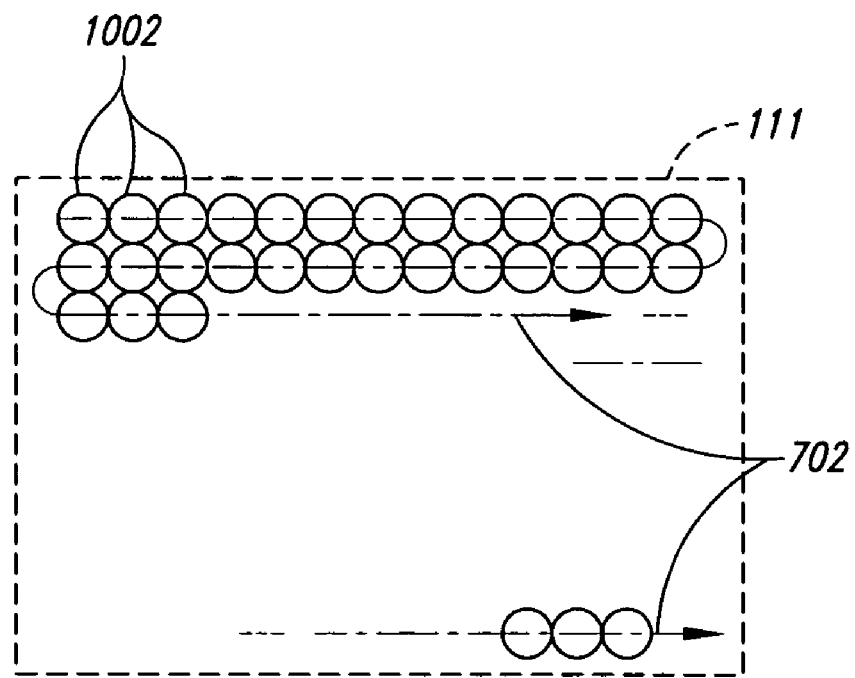
FIG. 10 illustrates a simplified scan pattern across a 2D field-of-view according to an embodiment.

FIG. 10 illustrates an idealized scan pattern of a 2D scanner across the field-of-view 111. The imager scans a beam of light along scan path 702. Individual reflectance values are determined at each of pixels 1002. The time for the beam to be scanned back-and-forth from the top left to the bottom right of the field-of-view, plus the time required for the beam to fly back to the starting position at the upper left is one frame time. In some applications, typical frame times may be between about 0.016 seconds (60 Hz) and 0.05 seconds (20 Hz). Other embodiments may have different frame times depending upon application and system requirements.

The beam scans horizontally across the entire field-of-view each time a line is incremented vertically. Thus, the horizontal scan may be called the fast scan and the vertical scan the slow scan. This arrangement of axes may be varied according to application and system requirements.

The example of FIG. 10 illustrates a pixelated sampling embodiment, wherein reflected light is sampled at discrete points to build a bitmap of the image. Alternatively, some applications us a continuously measured horizontal scan. One such example is the typical laser bar code scanner, which may sample substantially continuously to create a scan-reflectance-profile. It is intended that aspects of the invention relating thereto are applicable to either schema. For purposes of clarity, much of this discussion will draw examples from the pixelated sampling modality.

Figure 11A:
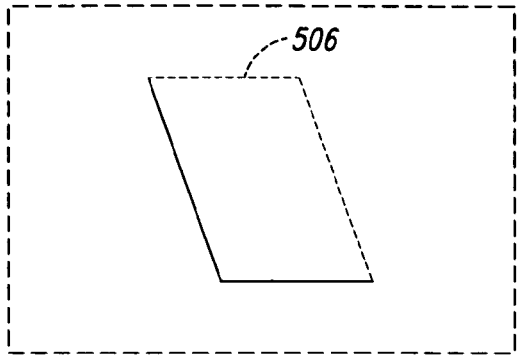
FIGS. 11a through 11f show illustrative uncompensated distortions of the symbol of FIG. 9 when moved through a field-of-view of a scanned beam imager having the scan pattern of FIG. 10 at a relatively high velocity in various directions.
Figure 11B:
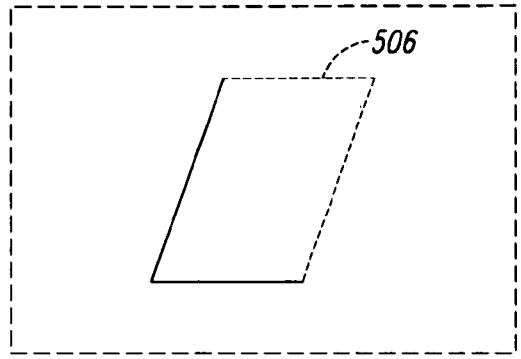
Figure 11C:
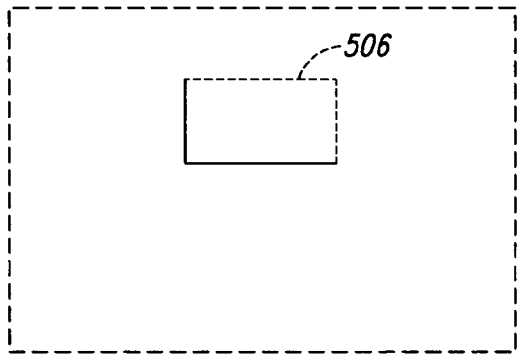
Figure 11D:
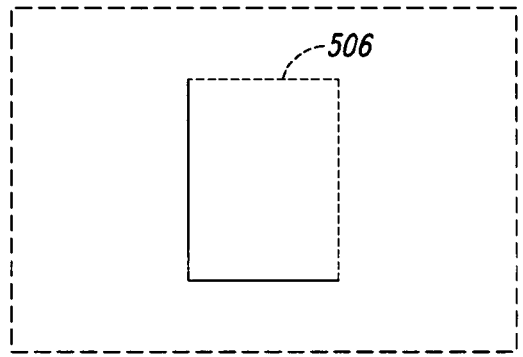
Figure 11E:
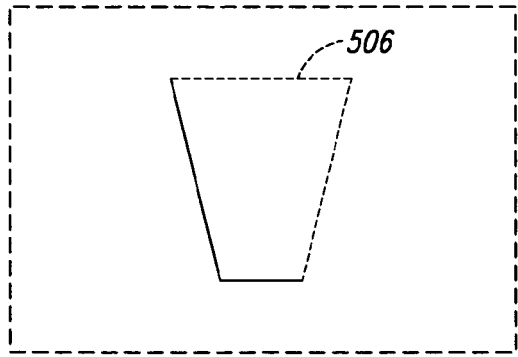
Figure 11F:
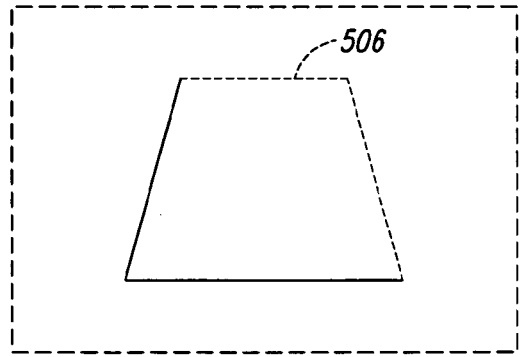

FIGS. 11a through 11f illustrate the distortion that can occur in the symbol of FIG. 9 when it is passed through the field-of-view of a scanned beam imager (scanning in the manner described in the example of FIG. 10) in various directions. Specifically, FIG. 11a shows the distortion of symbol 506 when the object 504 (not shown) on which the symbol is affixed moves through the field-of-view at a relatively high velocity in a left-to-right direction during the frame period. FIG. 11b shows distortion of symbol 506 when the object is moving in the right-to-left direction. FIG. 11c shows distortion of symbol 506 when the object is moving in a bottom-to-top direction. FIG. 1d shows distortion of symbol 506 when the object moves in a top-to-bottom direction. FIG. 11e shows the distortion of symbol 506 when the object is moving directly away from the scanned beam imager and FIG. 11f shows the distortion of symbol 506 when the object is moving directly toward the imager.

While referred to as motion of objects in the field-of-view, it should be understood that motion is relative. The distortion of FIGS. 11a through 11f as well as the compensation methods described herein also apply to cases where the imager is moving, the objects themselves being either at rest or in motion at a relative speed to the imager.

In some embodiments, the geometric distortion caused by movement of an object through the field-of-view may be compensated for by altering the pixel capture frequency, the vertical line spacing, or making other modifications to the scan pattern.

Figure 12:
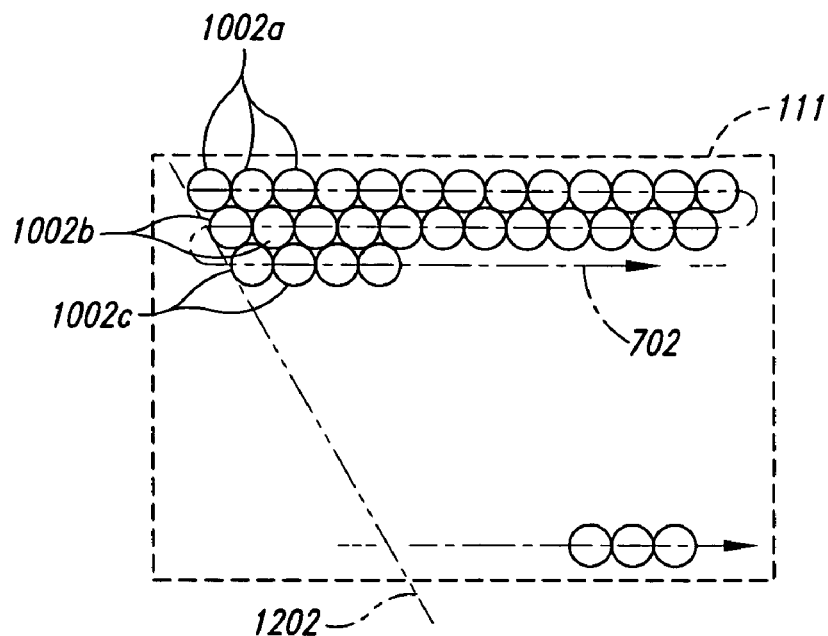
FIG. 12 illustrates a modified scan pattern to compensate for the distortion of FIG. 11a and by analogy 11b according to an embodiment.

FIG. 12 shows an idealized scan pattern corresponding to FIG. 10 that has been compensated to account for the object movement of FIG. 11a, according to an embodiment. As may be seen, the pixel timing has been altered relative to the nominal scan pattern of FIG. 10. This causes the pixels to track along with the movement of the symbol left-to-right through the field of view. The top row of pixels 1002a are shown in their nominal positions. The second row of pixels 1002b have been shifted to the right by an amount corresponding to the object velocity. In this case, the second row is a right-to-left scan so the pixel placement change may be made, for example, by adding a negative phase delay to the pixel clock. The third row of pixels 1002c is shifted farther to the right. Because the third row is shown as a left-to-right scan, the required pixel shift may be accomplished, for example, by adding a positive phase delay to the pixel clock. For the case of constant velocity, the magnitude of the phase delay for the third line is double that for the second line (although it is of opposite sign). For non-steady motion, the relationship between the magnitudes of phase delay per line may vary.

The actual field-of-view captured by the imaging device may change when the scan pattern is varied as shown. For example, the left edge of the field-of-view no longer follows the vertical line of field-of-view 111, but rather follows the slanted edge shown by line 1202. Right-to-left movement through the field-of-view may be compensated for in an analogous manner.

In a further refinement of the technique, the amount of pixel phase delay may be varied across each horizontal scan line to account for movement during the scan.

Figure 13:
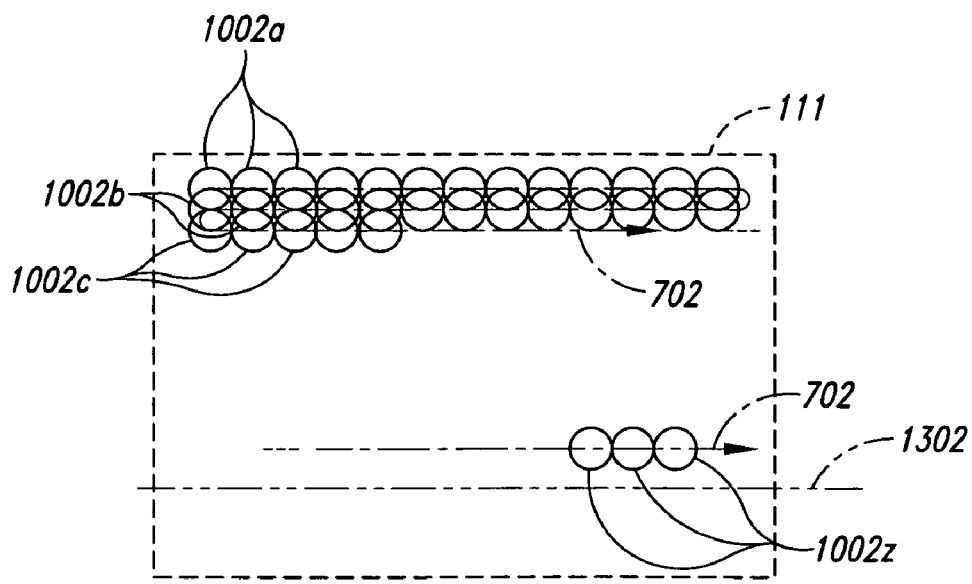
FIG. 13 illustrates a modified scan pattern to compensate for the distortion of FIG. 11c according to an embodiment.

FIG. 13 illustrates a scan pattern that has been perturbed to compensate for the bottom-to-top movement of the symbol of FIG. 11c, according to an embodiment. In this case the angular distance between horizontal scan lines may be reduced, recognizing that the bottom-to-top movement of the object through the field-of-view will provide the extra distance needed to maintain desired vertical spacing across the symbol. Scan path 702 scans back-and-forth down the nominal field-of-view 111. The top row of pixels 1002a occupy the first line. The second row of pixels 1002b, comprising the second line of the image, are scanned closer to the first row than the nominal scan pattern of FIG. 10. Similarly, the third row of pixels 1002c and other rows (not shown) are scanned at a relatively close vertical pitch. Taking the point of view of the moving reference frame of the object, this results in vertical pixel spacing on the moving image substantially equal to the vertical spacing resulting from the scan pattern of FIG. 10 when scanning a stationary image. A single frame, comprised of a specified number of rows and ending with the bottom row pixels 1002z, thus has a bottom limit at line 1302 when viewed from the stationary reference frame of the imager. In contrast, the field-of-view projected onto the moving object has the same extent as that of the scan pattern of FIG. 10 projected onto a stationary object.

Figure 14:
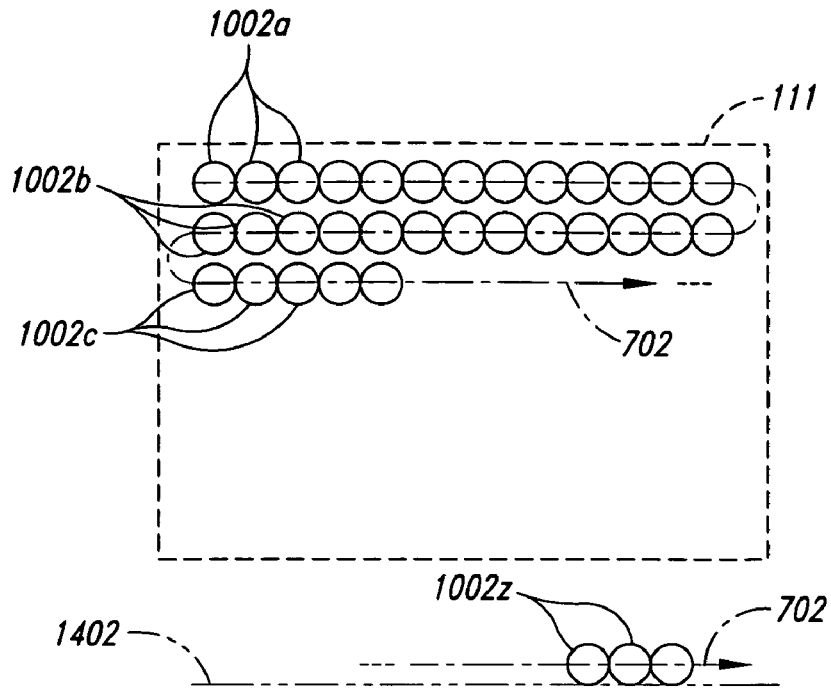
FIG. 14 illustrates a modified scan pattern to compensate for the distortion of FIG. 11d according to an embodiment.

FIG. 14 illustrates a scan pattern that has been modified from that of FIG. 10 to compensate for the top-to-bottom object movement through the field-of-view of FIG. 11d, according to an embodiment. Nominal field-of-view 111 is defined by pixels sampled along scan path 702. The top row of pixels 1002a may be captured in their normal position. Compared to the nominal scan pattern, however, the second row of pixels 1002b, third row of pixels 1002c, etc., culminating with the bottom row of pixels 1002z are captured at an expanded vertical pitch. That is, there is extra angular distance between scan lines. When projected onto an object moving from top-to-bottom through the field-of-view, this extra vertical pitch results in the scan lines "keeping up" with the motion of the object. This keeps the vertical pitch of the scan lines projected onto the moving object equal to the vertical pitch of the scan lines of FIG. 10 projected onto a stationary object. The desired number of horizontal lines may thus be maintained by scanning beyond the normal (fixed reference frame) vertical limits of the field-of-view, culminating for example at line 1402. Alternatively, the vertical extent of the image could be truncated at another point, for example at a point approximately corresponding to the bottom edge of nominal field-of-view 111.

Figure 15:
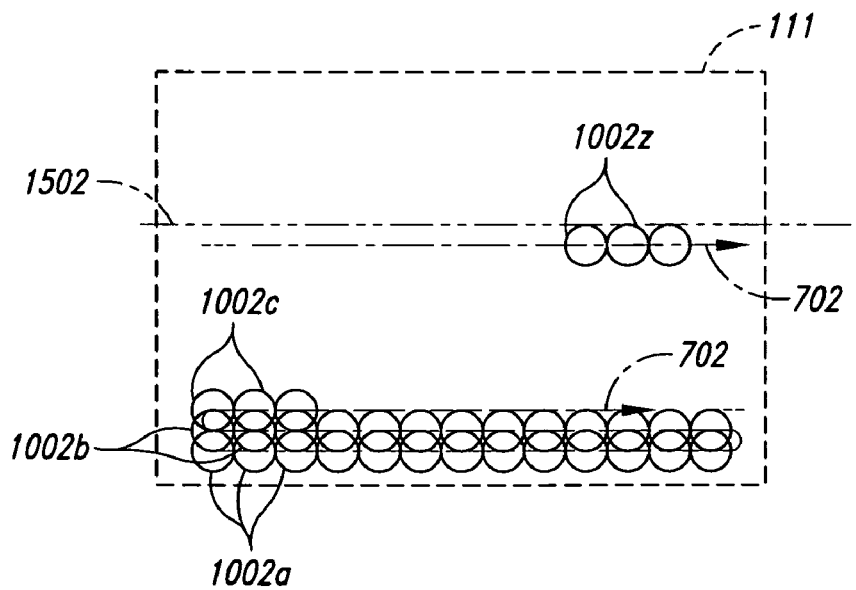
FIG. 15 illustrates an alternative modified scan pattern to compensate for the distortion of FIG. 11d according to an embodiment.

FIG. 15 illustrates an alternative scan pattern that has been modified from that of FIG. 10 to compensate for the top-to-bottom object movement through the field-of-view of FIG. 11d, according to an embodiment. In this example, the frame may be imaged from bottom-to-top. Scan path 702 defines a first row of pixels 1002a, a second row of pixels 1002b, a third row of pixels 1002c, etc., culminating with the last row of pixels 1002z. For a stationary object, the pixel rows may be spaced at the nominal spacing of FIG. 10, resulting in the desired projected spacing on the object. For an object moving from top-to-bottom through the field-of-view, however, it may be desirable to space the horizontal scan lines closer together vertically as indicated by FIG. 15. When the moving object provides the remainder of the nominal vertical pitch, this results in an image that is captured from the moving object at the desired vertical pitch. Because of the extra vertical distance provided by the moving object, the vertical extent of the stationary field-of-view may end with line 1502 coincident to the new upper edge.

Figure 16A:
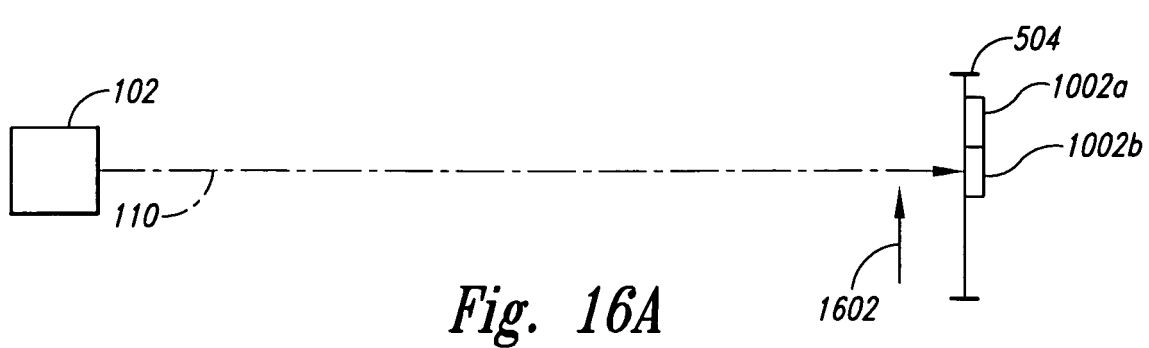
FIGS. 16a and 16b are side diagrams of a system where object motion equals a desired vertical scan velocity, resulting in a system that captures a 2D image using no vertical scan according to an embodiment.
Figure 16B:
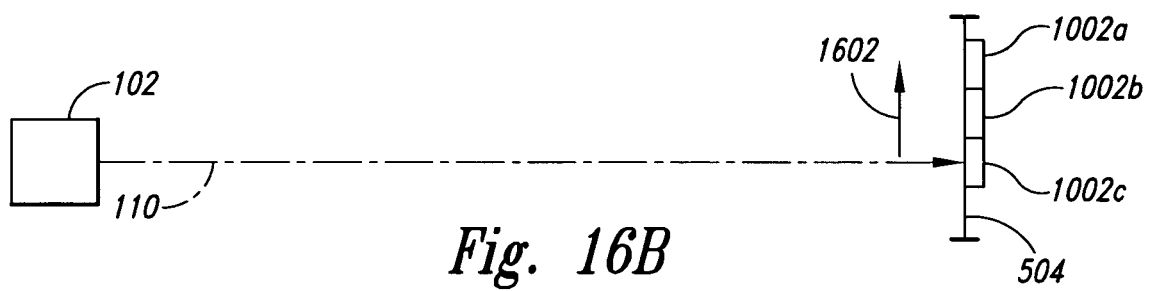

FIGS. 16a and 16b are side views of a scanner 102 scanning an object 504 moving at a high velocity past the scanner in the direction of arrow 1602, according to embodiments. In FIG. 16a, scanned beam 110 is shown impinging upon a second row of pixels 1002b below a first row of pixels 1002a. The beam is scanned at a vertical deflection angle, which in this case is horizontal. In FIG. 16b, the object 504 has moved upward relative to the scanner 102 in the direction of arrow 1602. At this instant, scanned beam 110 impinges upon a third row of pixels 1002c immediately below the second row of pixels 1002b. In this case, the velocity of the object past the scanned beam imager 102 is sufficient that the vertical deflection angle of the scanning beam 110 has remained horizontal while the object has moved a distance equal to pixel pitch.

Figure 17A:
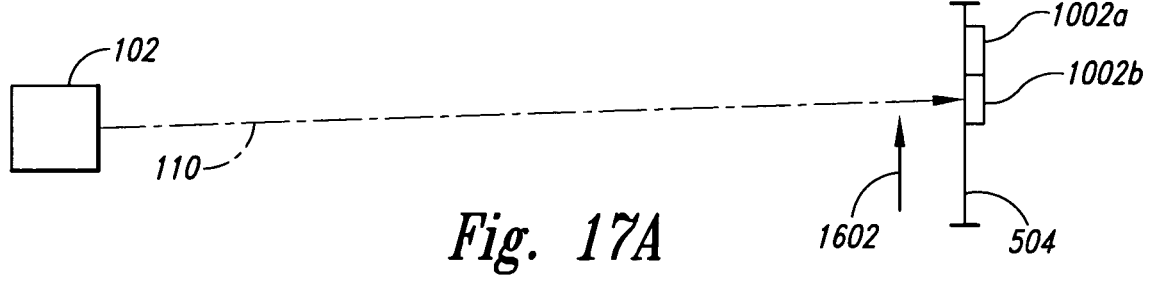
FIGS. 17a and 17b are side diagrams of a system where object motion exceeds a desired vertical scan velocity, resulting in a system that physically scans from bottom-to-top but captures the image in a top-to-bottom order according to an embodiment.
Figure 17B:
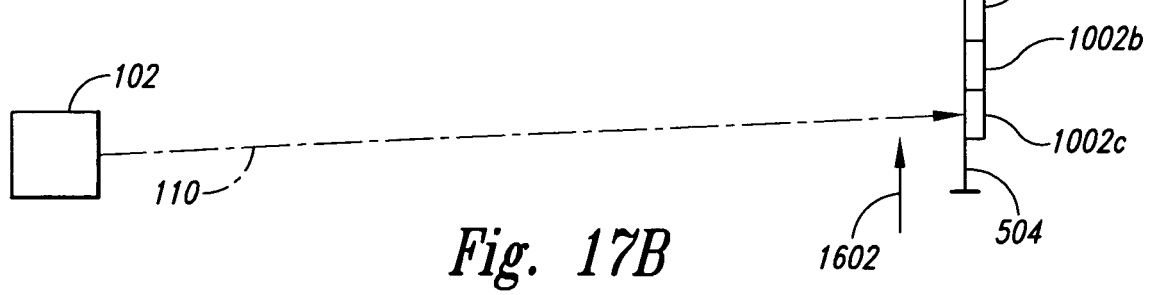

FIGS. 17a and 17b are side views of a scanned beam imager 102 scanning an object 504 moving at a very high velocity past the scanner in the direction of arrow 1602, according to embodiments. In FIG. 17a, scanned beam 110 is shown impinging upon a second row of pixels 1002b below a first row of pixels 1002a. The beam is scanned at a vertical deflection angle, which in this case is horizontal. In FIG. 17b, the object 504 has moved upward relative to the scanner 102 in the direction of arrow 1602. At this instant, scanned beam 110 impinges upon a third row of pixels 1002c immediately below the second row of pixels 1002b. In this case, the very high velocity of the object past the scanned beam imager 102 is sufficient that the scanning beam 110 has deflected upward to impinge upon pixel row 1002c. That is, the object has moved a distance greater than pixel pitch and the scanning beam 110 has had to scan upward to impinge upon a line of pixels below the previous line.

In other embodiments elements 1002a, 1002b, and 1002c may represent rows of scanned elements that are not lines of adjacent pixels per se. Rather, it may be preferable to scan the surface somewhat more sparsely and element rows 1002a, 1002b, and 1002c may represent a plurality of linear bar code symbols or a stacked 2D bar code symbol.

Figure 18A:
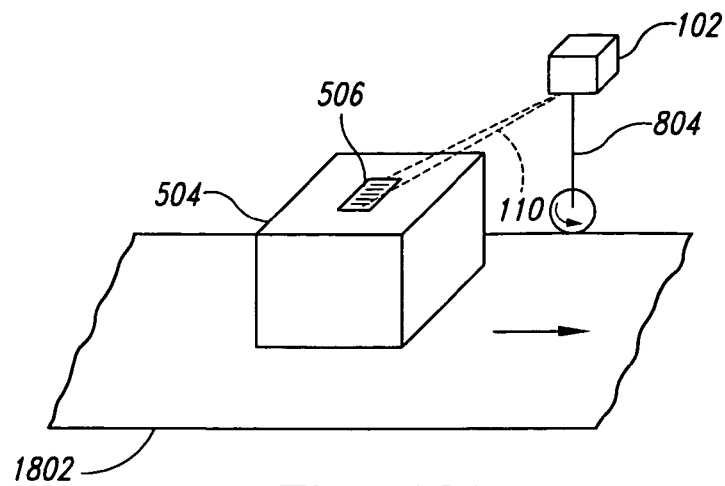
FIGS. 18a, 18b, and 18c are isometric views of a fixed mount scanner over a moving conveyor belt scanning objects as they pass according to an embodiment.
Figure 18B:
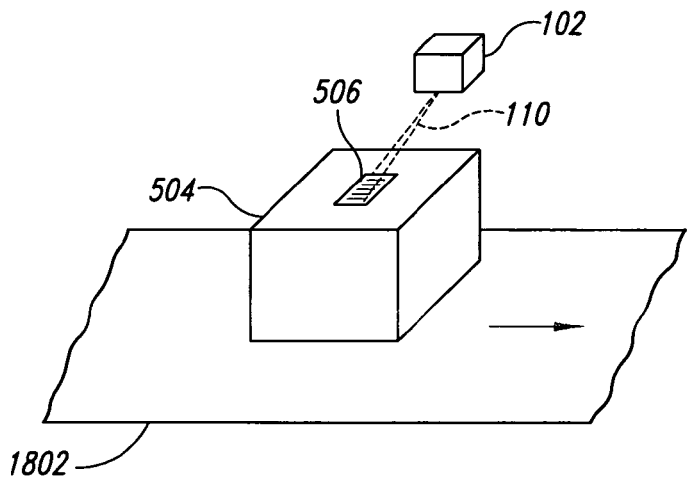
Figure 18C:
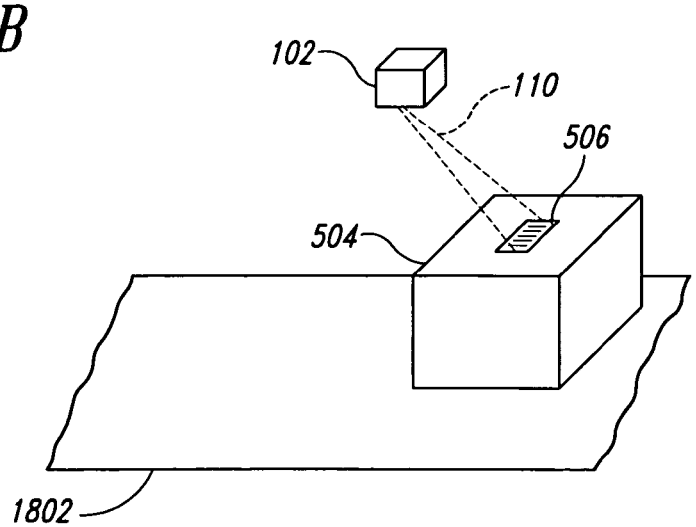

FIGS. 18a through 18c are isometric views of a scanned beam imager 102 scanning a symbol 506 on an object 504 moving past at a very high velocity on a conveyor belt 1802, according to embodiments. FIG. 18a shows optional motion detector 804, here depicted as a velocimeter that may be used to track belt speed. The example of FIGS. 18a through 18c may correspond, for example, to the example of FIGS. 16a, 16b, 17a and 17b where the vertical scan rate of the imager is used to pace the moving object. In each of FIGS. 18a, 18b, and 18c, the projected line on the symbol has moved "up" the symbol while the actual scan angle of the scanning beam 110 has moved "down" and the object has moved "down" through the field-of-view even faster. In pacing the movement of an object, the vertical scan rate may be made somewhat faster than the speed of the object or somewhat slower than the speed of the object. In the former case, the object is scanned from top-to-bottom and in the latter case the object is scanned from bottom-to-top.

The table below illustrates the compounding effects of scanned beam vertical movement with object vertical movement for a subset of possible object velocities. The particular velocities shown are exemplary of a particular embodiment and scan range but are indicative of the principle. In this example, we will assume the maximum vertical scan rate to equal 22 inches per second (ips) at the surface to be imaged and that 22 ips is the linear vertical scan velocity required to maintain appropriate vertical pixel spacing given a constant (resonant) horizontal scan rate, horizontal scan angle, approximately SVGA resolution, and distance to object. Negative numbers indicate bottom-to-top motion and positive numbers top-to-bottom motion.

| Object Velocity (ips) | Vertical Scan Velocity (ips) | Net Scan Velocity (ips) |
|---|---|---|
| −44 | +22 | −22 |
| −33 | +11 | −22 |
| −22 | 0 | −22 |
| −11 | −11 | −22 |
| 0 | −22 | −22 |
| 0 | +22 | +22 |
| +11 | +11 | +22 |
| +22 | 0 | +22 |
| +33 | −11 | +22 |
| +44 | −22 | +22 |

It can be seen from inspection of the table that according to the present invention it is possible to maintain the desired 22 ips vertical scan rate with object speed ranging from zero (stationary) up to 44 ips in either direction along the vertical axis of the scanner (which, as could be seen in FIGS. 18a-18c may not be literally vertical). This range may be increased by many variables including increasing the distance to the surface, increasing the maximum vertical scan angular rate, increasing the desired or allowable pixel vertical spacing, adding multiple beam scanning, or other changes that may be appropriate for various application or system requirements.

Figure 19:
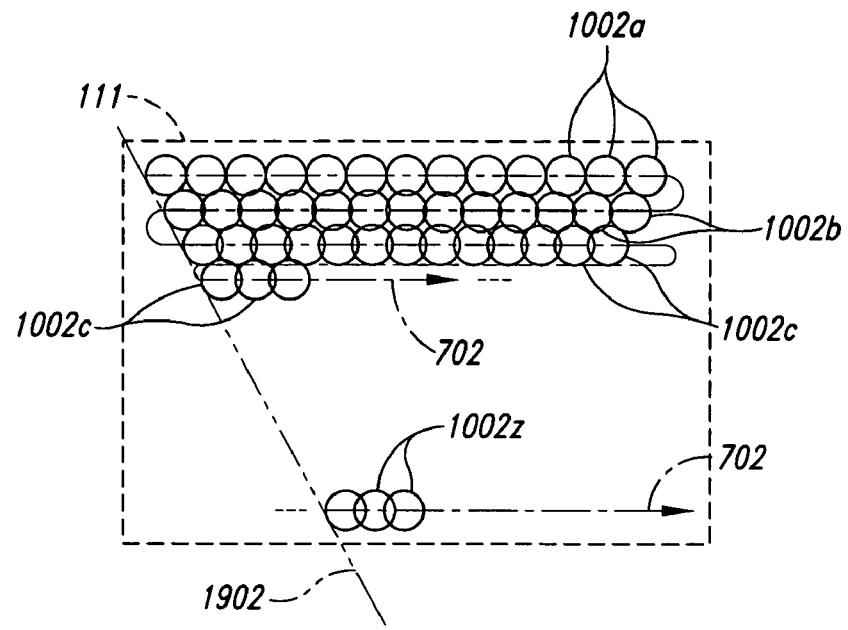
FIG. 19 illustrates a modified scan pattern to compensate for the distortion of FIG. 11e according to an embodiment.

FIG. 19 illustrates a scan pattern that has been modified from that of FIG. 10 to compensate for the near-to-far object movement through the field-of-view of FIG. 11e, according to an embodiment. The top row of pixels 1002a may be captured in their normal position. Compared to the nominal scan pattern, however, the second row of pixels 1002b, third row of pixels 1002c, etc., culminating with the bottom row of pixels 1002z are captured at a monotonically decreasing vertical pitch by varying the vertical spacing of scan path 702. Horizontal placement of pixels is also squeezed. The net effect of these changes is that the geometric spacing of pixels projected onto the object is held constant even though the object is moving away from the scanner. The desired number of horizontal lines may be maintained by ending the vertical scanning early, above the nominal bottom of the field-of-view. Alternatively, the vertical extent of scan could be maintained at the nominal limits as shown in the example or another vertical extent could be chosen.

In some applications, such as the example pictured, it may be advantageous to maintain a constant maximum horizontal scan angle but simply change the pixel sampling along that axis. This may be advantageous for resonant horizontal scanners such as some MEMS scanners for example, or for scanners, such as rotating polygons where the scan angle cannot be readily adjusted.

To maintain a constant fill factor (the ratio of sampled area to pixel spacing) and therefore constant geometric resolution on the object, the beam shape may be altered synchronously with pixel spacing decreases. For example, the beam waist may be reduced in size and/or moved out with the object. Alternatively, the waist position may be chosen such that an object moving away from the scanner is impinged by a substantially constant beam diameter. This may be done by setting the waist beyond the maximum object range, such that the object moves radially along the tapering portion of the beam between the scanner and the waist. Alternatively, the beam shape may be set constant such that it has a reasonable size throughout the working range of the scanner.

Figure 20:
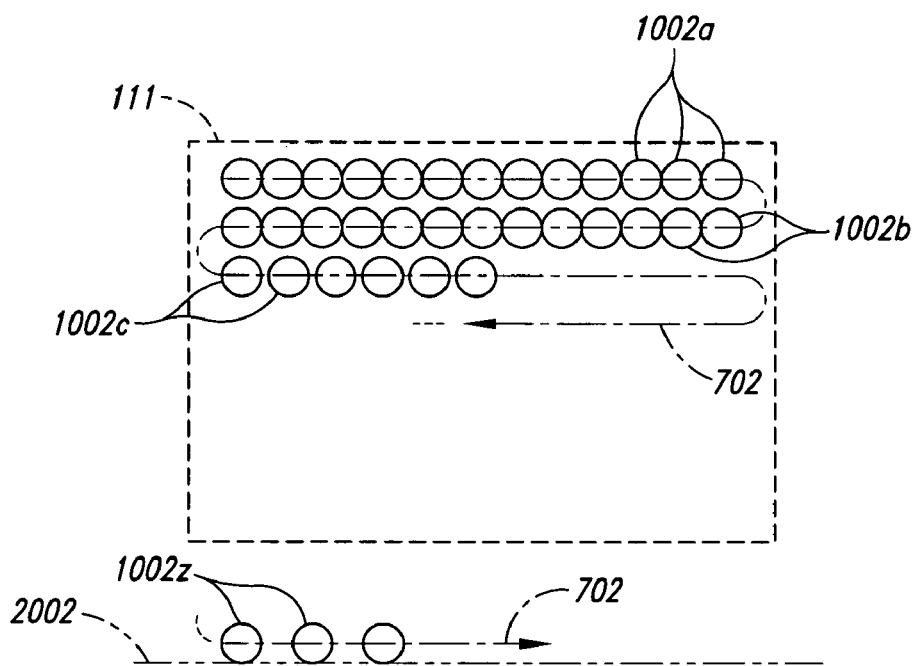
FIG. 20 illustrates a modified scan pattern to compensate for the distortion of FIG. 11f according to an embodiment.

FIG. 20 illustrates a scan pattern that has been modified from that of FIG. 10 to compensate for the far-to-near object movement through the field-of-view of FIG. 11f, according to an embodiment. The top row of pixels 1002a may be captured in their normal position. Compared to the nominal scan pattern, however, the second row of pixels 1002b, third row of pixels 1002c, etc., culminating with the bottom row of pixels 1002z are captured at a monotonically increasing vertical pitch. To do this, the vertical scan rate may be increased during the frame while the horizontal scan rate is held constant. Horizontal placement of pixels is also increased. The net effect of these changes is that the geometric spacing of pixels projected onto the object is held constant even though the object is moving toward the scanner. The desired number of horizontal lines may be maintained by extending the vertical scan beyond the nominal bottom of the field-of-view, as illustrated by line 2002. Alternatively, the vertical extent of scan could be maintained at the nominal limits or another vertical extent could be chosen by varying the number of scan lines.

Another way to compensate for object motion through the imager's field-of-view is to maintain a substantially constant matrix of captured pixels, but to adjust the pixel spacing in software. For example, adjusted pixel values may be determined by interpolating between or combining captured pixels. The inventors have discovered that this is made practical by a scanned beam imager because the individual pixel capture time may be short enough, for example at a few nanoseconds to a few tens of nanoseconds, to avoid individual pixel blur. Motion is instead exhibited as the type of object skew illustrated by FIGS. 11a through 11f.

The motion distortion illustrated by FIGS. 11a through 11f may be combined. That is, FIGS. 11a through 11f were each drawn showing only a single motion vector. In some applications, motion may be so dominated by one vector that other directions of motion may be ignored. In other applications, it may be advantageous to simultaneously compensate for motion in two or more axes. The motion compensation techniques shown in FIGS. 12 through 20 or additional techniques not shown may be combined to account for multi-axis motion.

Figure 21:
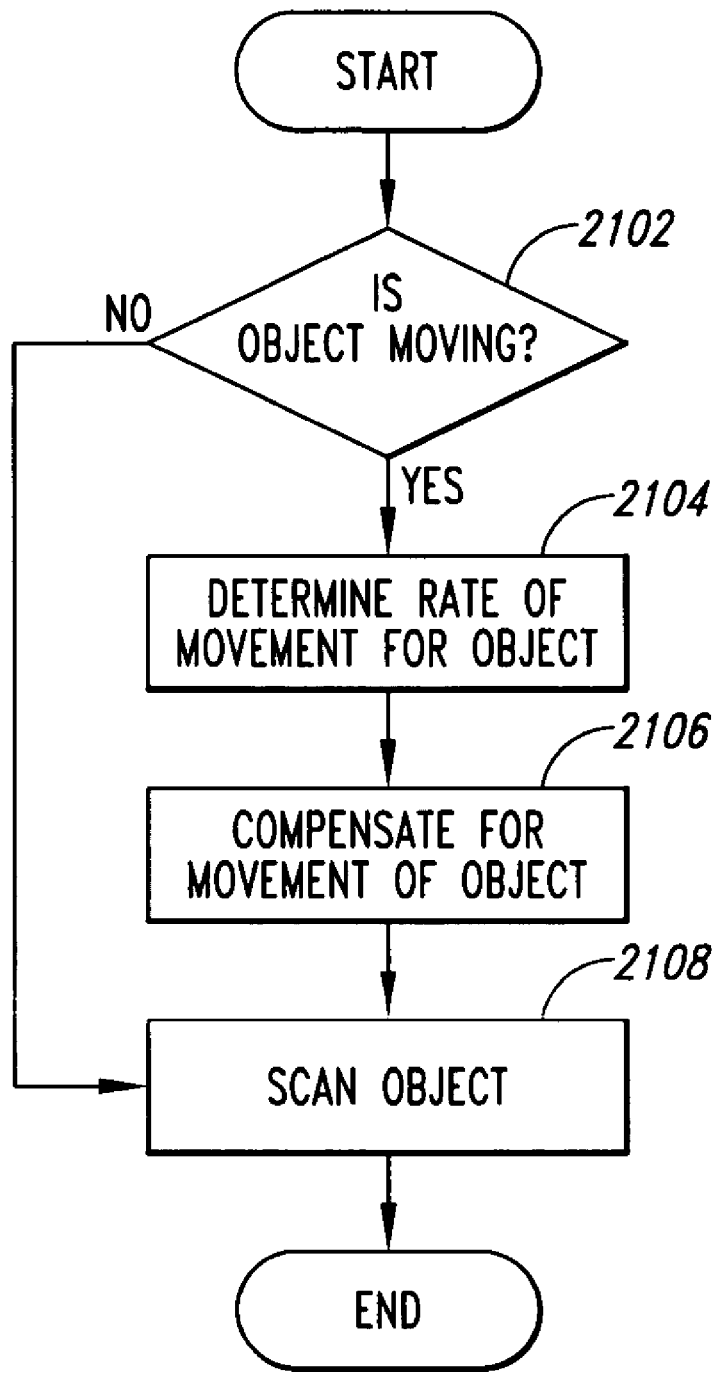
FIG. 21 is a flowchart illustrating an overview of the logic for compensating for a moving target object within a scanning beam imager's field of view according to an embodiment.

FIG. 21 is a flowchart illustrating an overview of the operation of an imager with motion compensation, according to an embodiment. At a decision operation 2102, the logic flow determines if the object is moving relative to the scanner's field-of-view. In one embodiment, the invention will determine the object is moving if the object follows any one of the patterns illustrated in FIGS. 11a through 11f. In other embodiments, a motion detector (such as motion detector 804 of FIG. 8) may inform the controller that the object is moving. In other embodiments, the imager may be informed from an outside source, such as a conveyor belt controller or printer controller, for example through an interface (such as interface 120 of FIG. 1 and elsewhere).

When the determination at the decision operation 2102 is true, the logic flow advances to an operation 2104 where the rate of movement of the object is determined. The rate of movement may be determined in many different ways including: (1) comparing the positions of the target object in two images taken at two distinct times; (2) determining the displacement of the target object between the two images; and (3) calculating the rate of movement in accordance with the amount of displacement and the amount of time between the images. In other embodiments, the motion detector may provide the rate of movement information. In still other embodiments, rate of movement information may be provided manually or through an interface.

After moving to an operation 2106, the imager compensates for the determined movement of the target object. For example, the imager may adjust the operation of the scanner by changing the scanner's oscillation frequency, by changing the pixel capture phase or frequency, by changing the vertical scan rate, by changing the pixel map, or other methods. FIGS. 12 through 20 illustrate several compensation techniques. The imager may also compensate for the movement of the target object in software. After the movement of the object is motion compensated for by the imager, the logic flow moves to an operation 2108 where the target object is scanned by the imager. Alternatively, when the decision operation 2102 determines that the target object is not moving, the logic flow may jump to the operation 2108 and scan the target object. Moving from operation 2108, the logic flow returns to executing other operations.

In practice it may be desirable to combine two or more of the steps of FIG. 21. For example, when object movement rate is provided by an encoder or is pre-set, the determination of whether the object is moving and its movement velocity takes place substantially simultaneously. When set for objects of substantially constant movement velocity, such as in a conveyor scanning application for example, the decision step 2102 may be eliminated and the scan always synchronized to the set or determined velocity. In other cases, the compensation and object scanning steps 2106 and 2108 may be performed substantially simultaneously.

Figure 22:
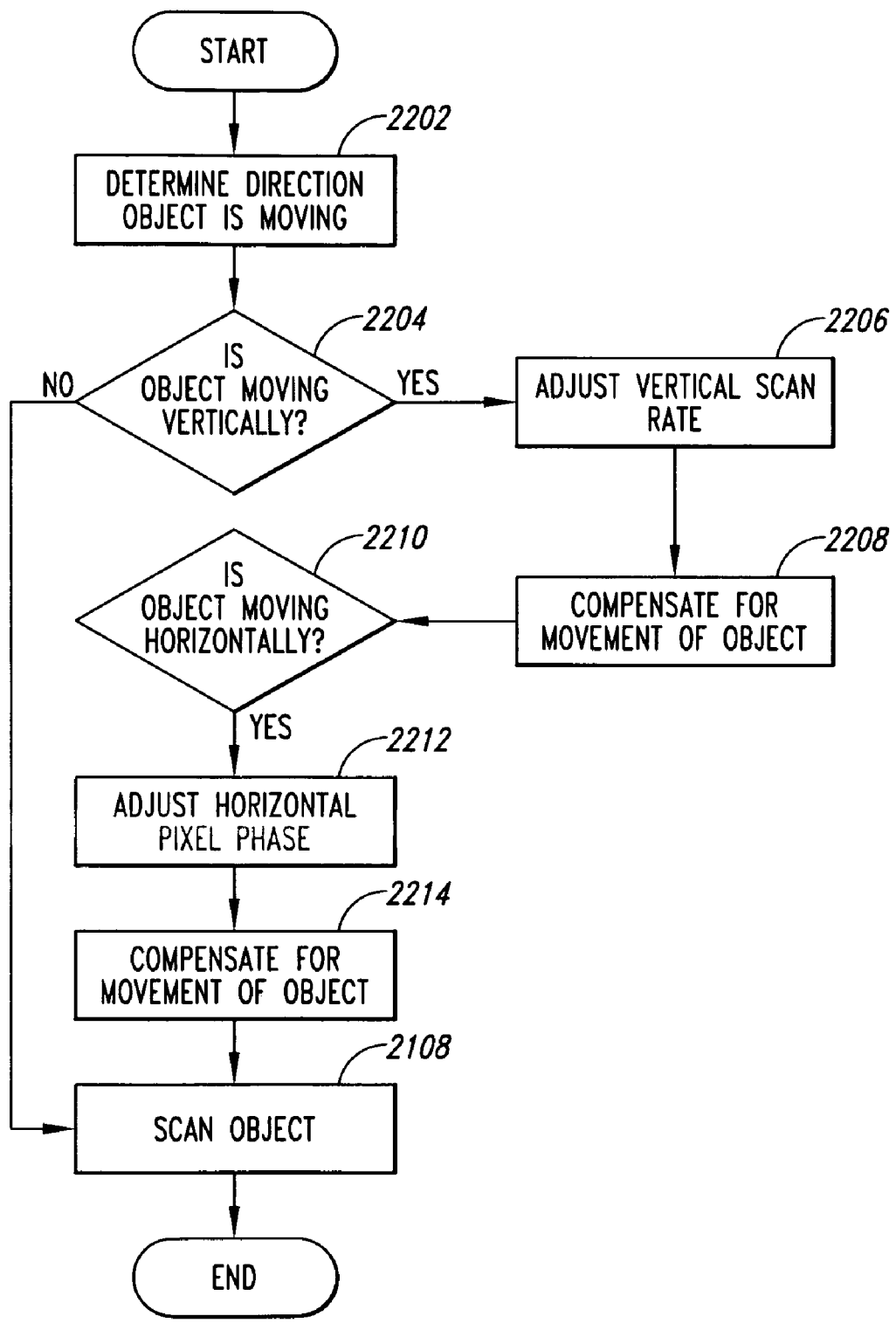
FIG. 22 is a flowchart showing logic for adjusting scanning rate and/or pixel phase based on the motion of a target object according to an embodiment.

FIG. 22 is a flowchart that illustrates adjusting the scan rate (oscillation frequency) of an imager's scanner in response to determining that a target object is moving, according to an embodiment. A decision operation 2202 determines the direction of movement of the target object. The decision operation 2204 determines when the target object is moving vertically. If true, the logic flow moves to the operation 2206 where the vertical scan rate of the imager's scanner is adjusted to compensate for the determined vertical movement of the target object.

The vertical scan rate is adjusted when the target object is determined to be moving in either an upward or downward direction. If the target object is moving upward, the downward vertical scan rate of the scanner may be decreased or the upward vertical scan rate increased. Similarly, when the target object is determined to be moving downward, the downward vertical scan rate may be increased or the upward vertical scan rate decreased.

The logic flow moves to an operation 2208 where the imager may further compensate for the moving target object. In some embodiments, operation 2208 may be inherent in the vertical scan rate adjustment 2206. In other embodiments, operation 2208 may be used in place of or in conjunction with vertical scan rate adjustment 2206. For example, image processing and signal processing software could be used to compensate for the determined movement of the image of the target object. Various algorithms for object recognition, to determine orientation of objects, and to determine speed of the object may be used.

When the decision operation 2204 determines a vertical image movement did not occur or the vertical scan rate was adjusted at the operation 2206 and/or optionally further compensated at the operation 2208, the logic flow will advance to a decision operation 2210 and determine if the target object is moving in a horizontal direction. If so, the logic flow moves to an operation 2212 and the horizontal pixel phase of the scanner is adjusted.

When it is determined that the target object is moving in a left-to-right horizontal direction, the pixel sampling method shown if FIG. 12 may be used. For right-to-left horizontal movement, the method may be reversed, instead sampling pixels from successive rows slightly to the left of the corresponding pixel in the row above. As described for FIG. 12, this may result in positive or negative phase delays depending upon scan direction. Horizontal movement in either direction may analogously compensated for with an upward vertical scan.

When pixel phase has been adjusted, or instead of pixel phase adjustment, the logic flow advances to an operation 2214 where the imager may further compensate for the moving target object with image processing software.

From the operation 2214, the logic flow steps to an operation 2108 where the target object is scanned by the imager and images of the object are processed. Also, when the determinations at either of the decision operations 2204 and 2210 are false, the logic flow will jump to the operation 2108 and perform substantially the same operations discussed above. Next, the logic flow returns to executing other operations.

When physical adjustments (phase, rate, etc.) are made to the scan pattern and the object scanning step 2108 is subsequently performed, optional processing steps 2208 and 2214 may by performed thereafter rather than in the order depicted by the flow chart of FIG. 22. Conversely, for applications where motion compensation is performed in software and scanner physical parameters (phase, rate, etc.) are not adjusted, the system may jump directly to step 2108 with image processing steps 2208 and/or 2214 performed thereafter.

In other embodiments where object motion is known or may be predicted in advance, the flow chart of FIG. 22 may represent an initiation routine for the system. In that case, the scanner may be operated according to the determined parameters with minimal or no further adjustment of the parameters on a scan-by-scan basis. For such pre-set applications (examples include constant speed conveyor belt or printing press or moving motor vehicle scanning), it may be desirable to maintain a statistical matching of scanning parameters with residual image distortion. Such a system may be used to compensate for operational variations in the speed of the objects being scanned. For instance, two compressed top-to-bottom vertical scans in a row may indicate a change in conveyor speed that necessitates an adjustment in vertical scan rate.

While the cases for motion toward or away from the imager are not shown directly in FIG. 22, they may be compensated for similarly using the sampling methodologies shown in FIGS. 19 and 20, or in combination or alternative, using software compensation.

Figure 23:
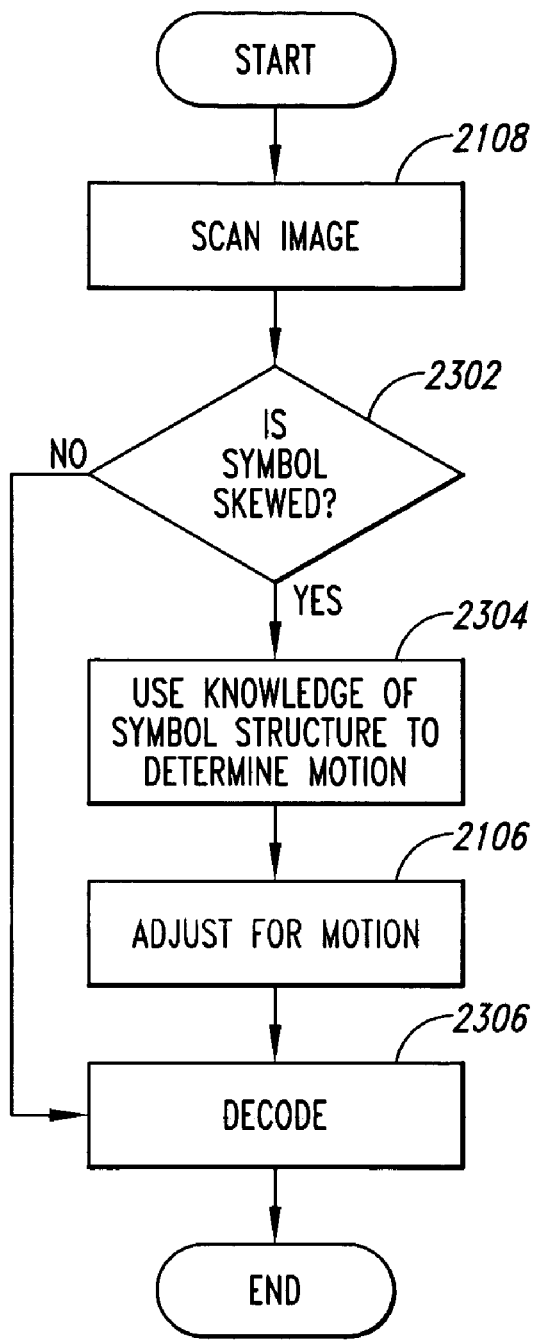
FIG. 23 is a flowchart illustrating logic for determining motion based on a priori knowledge of the shape of an object passing through the field-of-view according to an embodiment.

FIG. 23 is a flowchart illustrating use of inherent knowledge of a reflective symbol in a scanned target object to determine motion in the image of the object, according to an embodiment. This embodiment may be particularly useful when the imager is intended to scan target objects with known geometries such as 1D or 2D bar codes, OCR, etc.

When the logic flow advances to an operation 2108, a reflective symbol on a target object is scanned and an image of the symbol is saved. A decision operation 2302 determines if the scanned image of the symbol on the target object is skewed. Typically, the image of the symbol will be skewed if it moved significantly during the scan of the target object. When the inherent knowledge of this type of symbol indicates a square shape and the scanned image of the symbol includes a rectangular shape, the invention will determine that the target object moved during scanning. Any one of several image processing techniques can be used to determine if the image shape of the symbol is incorrect, i.e., skewed.

When the decision operation 2302 determines that the image of the symbol is skewed, the inherent knowledge of the symbol structure is employed to determine the direction(s) and/or speed of the motion at an operation 2304. Various transforms may be applied to the image of the symbol to transform it back to its known shape. At an operation 2106, the particular transformation used to convert the "skewed" shape of the image of the symbol back to its known shape is employed to compensate for the motion of the target object through the field-of-view. The skewed image may be also compensated for by physically adjusting the scanning rates of the scanner or with other image processing software.

The logic flow moves to an operation 2306 and the image of the symbol is decoded. Also, when the decision operation 2302 is false (image not skewed), the logic flow jumps to the operation 2306. Next, the logic flow returns to executing other operations.

When the motion of a decodable object such as a 2D symbol is known or may be determined, knowledge of that motion may be used to modify decode parameters and thereby enhance decoding performance. For example, linear (1D) bar code decoders frequently have band-pass filters to aid in rejecting noise. An upper band-pass filter (a low pass filter) may be used to determine the minimum x-dimension and maximum range at which the unit will decode. A lower band-pass filter (a high pass filter) may be used to determine the maximum element size that will be fed into the decoder. Knowledge of object motion may be used to modify the pass-bands, for example increasing the frequency of the upper pass-band and/or decreasing the frequency of the lower pass band to compensate for the changed apparent x-dimension of an object moving rapidly in a horizontal direction.

Similarly, 2D matrix symbols are characterized by a cell size that is nominally equal in both the x- and y-dimensions. A moving symbol may exhibit a cell size that is apparently different in the two axes. Thus, one way to compensate for motion of 2D symbols is to allow for differing cell sizes in each axis during decode.

Although the embodiments according to the invention described herein are described above as including one scanner, it is envisioned that a plurality scanners may be used with this invention (not shown). One or more light beams could be projected at the plurality of scanners that would reflect the light onto a target object in scan patterns and at frequencies that may or may not be substantially similar.

The preceding overview of the invention, brief description of the drawings, and detailed description describe exemplary embodiments of the present invention in a manner intended to foster ease of understanding by the reader. Other structures, methods, and equivalents may be within the scope of the invention. As such, the scope of the invention described herein shall be limited only by the claims.

What is claimed is:

1. A scanned beam imager, comprising;
    a beam director for scanning a beam of light across a field-of-view,
    a light detector for detecting light from the beam scattered by the field-of-view, and
    a controller that modifies the phase of pixels captured by said light detector responsive to the motion of objects in the field-of-view; and
    further comprising a motion detector coupled to said controller for measuring the motion of objects in the field-of-view, wherein said motion detector includes software for analyzing the apparent motion in captured images, and wherein said software for analyzing the apparent motion in captured images includes software for examining the skew of a machine readable symbol and for adjusting the skew if needed.

2. The scanned beam imager of claim 1, wherein said motion detector includes an interface for receiving motion information.

3. The scanned beam imager of claim 1, wherein said software for analyzing the apparent motion in captured images includes software for examining the elongation or compression of a machine readable symbol.

4. The scanned beam imager of claim 1, wherein said motion detector includes a velocimeter.

5. The scanned beam imager of claim 1, wherein said beam director directs the beam in two dimensions across the field-of-view.

6. The scanned beam imager of claim 1, wherein said beam director further comprises;
    a laser diode for emitting a non-scanning beam, and
    a scanning mirror for deflecting the non-scanning beam across the field-of-view.

7. A method for capturing an image from a moving object, comprising:
    receiving motion information about an object in a field-of-view,
    selecting at least one scanning parameter responsive to the received object motion information,
    scanning a beam of light across the field-of-view using the selected at least one scanning parameter, and
    detecting light scattered by the field-of-view;
    wherein said receiving motion information includes analyzing the apparent motion in captured images, and wherein said analyzing the apparent motion in captured images includes examining, in a machine readable symbol, at least one of the parameters consisting of skew, elongation, or compression, or combinations thereof, and adjusting one or more of the parameters if needed.

8. The method for capturing an image from a moving object of claim 7, wherein said receiving motion information includes receiving data through an interface.

9. The method for capturing an image from a moving object of claim 7, wherein said receiving motion information includes receiving data from a velocimeter.

10. The method for capturing an image from a moving object of claim 7, wherein said at least one scanning parameter includes vertical scan direction.

11. The method for capturing an image from a moving object of claim 7, wherein said at least one scanning parameter includes vertical scan rate.

12. The method for capturing an image from a moving object of claim 7, wherein said at least one scanning parameter includes horizontal scan amplitude.

13. The method for capturing an image from a moving object of claim 7, wherein said at least one scanning parameter includes pixel phase.

14. The method for capturing an image from a moving object of claim 7, wherein said selecting at least one scanning parameter responsive to the received object motion information, includes selecting a scan rate to pace the moving object.

15. The method for capturing an image from a moving object of claim 14, wherein said image comprises a series of one-dimensional lines.

16. The method for capturing an image from a moving object of claim 7, wherein said image comprises a two-dimensional image.

* * * * *